US008667057B1

(12) United States Patent
Adya et al.

(10) Patent No.: US 8,667,057 B1
(45) Date of Patent: Mar. 4, 2014

(54) METHOD AND SYSTEM FOR DELIVERING OBJECT UPDATE MESSAGES INCLUDING PAYLOADS

(75) Inventors: Atul Adya, Bellevue, WA (US); Gregory H. Cooper, Seattle, WA (US); Daniel Sumers Myers, Seattle, WA (US); Michael Piatek, Seattle, WA (US)

(73) Assignee: Google Inc., Mountain View, CA (US)

( * ) Notice: Subject to any disclaimer, the term of this patent is extended or adjusted under 35 U.S.C. 154(b) by 93 days.

(21) Appl. No.: 13/251,017

(22) Filed: Sep. 30, 2011

Related U.S. Application Data

(60) Provisional application No. 61/389,160, filed on Oct. 1, 2010.

(51) Int. Cl.
G06F 15/16 (2006.01)

(52) U.S. Cl.
USPC .......................................... 709/203; 709/219

(58) Field of Classification Search
USPC ................................. 709/203, 219
See application file for complete search history.

(56) References Cited

U.S. PATENT DOCUMENTS

| | | | |
|---|---|---|---|
| 5,421,009 A | 5/1995 | Platt | |
| 5,734,898 A | 3/1998 | He | |
| 6,029,175 A * | 2/2000 | Chow et al. ........................... | 1/1 |
| 6,052,735 A | 4/2000 | Ulrich et al. | |
| 6,289,510 B1 | 9/2001 | Nakajima | |
| 6,317,754 B1 | 11/2001 | Peng | |
| 6,738,812 B1 | 5/2004 | Hara et al. | |
| 7,043,263 B2 | 5/2006 | Kaplan et al. | |
| 7,107,330 B1 | 9/2006 | Hamilton, II et al. | |
| 7,203,708 B2 | 4/2007 | Liu et al. | |
| 7,243,163 B1 | 7/2007 | Friend et al. | |
| 7,383,289 B2 | 6/2008 | Kraft | |
| 7,480,907 B1 | 1/2009 | Marolia et al. | |
| 7,962,918 B2 | 6/2011 | Schaefer et al. | |
| 8,015,269 B2 | 9/2011 | Kiyohara et al. | |
| 8,200,755 B2 | 6/2012 | Fujimoto et al. | |
| 8,359,330 B2 | 1/2013 | Sakamoto | |
| 2002/0024947 A1 | 2/2002 | Luzzatti et al. | |
| 2002/0111972 A1 | 8/2002 | Lynch et al. | |
| 2003/0023770 A1 | 1/2003 | Barmettler et al. | |
| 2003/0028683 A1 | 2/2003 | Yorke et al. | |
| 2003/0066065 A1* | 4/2003 | Larkin .......................... | 717/177 |

(Continued)

OTHER PUBLICATIONS

Kulkarni, Information Access in Mobile Computing Environments, U. of Notre Dame, Technical Report 93-11, Oct. 1993, 17 pgs.

*Primary Examiner* — Yves Dalencourt
(74) *Attorney, Agent, or Firm* — Morgan, Lewis & Bockius LLP

(57) ABSTRACT

A distributed network system includes at least one server and one client device, each having memory and one or more processors. The server performs the following operations: selecting a first client-object registration record including a first client identifier and a first object identifier; retrieving a pair of server-side object version and client-side object version from the first client-object registration record; determining a first set of incremental payloads to be delivered to the client device associated with the first client identifier in accordance with the pair of server-side object version and client-side object version; retrieving the first set of incremental payloads from a first object update record including the first object identifier; and sending a first object update message to the first client device, wherein the first object update message includes the first object identifier, the server-side object version and the retrieved first set of incremental payloads.

16 Claims, 17 Drawing Sheets

(56) References Cited

U.S. PATENT DOCUMENTS

| | | |
|---|---|---|
| 2003/0120624 A1 | 6/2003 | Poppenga et al. |
| 2003/0120873 A1 | 6/2003 | Kanaley |
| 2003/0195951 A1 | 10/2003 | Wittel, Jr. et al. |
| 2003/0221190 A1 | 11/2003 | Deshpande et al. |
| 2004/0015942 A1 | 1/2004 | Branson et al. |
| 2004/0064650 A1 | 4/2004 | Johnson |
| 2004/0107242 A1 | 6/2004 | Vert et al. |
| 2004/0128346 A1 | 7/2004 | Melamed et al. |
| 2004/0261082 A1 | 12/2004 | Steere et al. |
| 2005/0097610 A1 | 5/2005 | Pedlow et al. |
| 2006/0092861 A1 | 5/2006 | Corday et al. |
| 2006/0168325 A1 | 7/2006 | Wood et al. |
| 2006/0174242 A1 | 8/2006 | Zhu et al. |
| 2007/0079091 A1 | 4/2007 | Collins et al. |
| 2007/0088733 A1 | 4/2007 | Bodge et al. |
| 2008/0098473 A1 | 4/2008 | Liu et al. |
| 2008/0114860 A1 | 5/2008 | Keys et al. |
| 2008/0183628 A1 | 7/2008 | Oliver et al. |
| 2008/0270409 A1 | 10/2008 | Naito et al. |
| 2009/0003620 A1 | 1/2009 | McKillop et al. |
| 2009/0018998 A1 | 1/2009 | Patten, Jr. et al. |
| 2009/0042536 A1 | 2/2009 | Bernard et al. |
| 2009/0042563 A1 | 2/2009 | Bernard |
| 2009/0172177 A1 | 7/2009 | Lu |
| 2009/0234927 A1 | 9/2009 | Buzescu |
| 2009/0248739 A1 | 10/2009 | Cao et al. |
| 2009/0305778 A1 | 12/2009 | Yu et al. |
| 2010/0057839 A1 | 3/2010 | Sakai et al. |
| 2010/0106932 A1 | 4/2010 | Ogasawara |
| 2010/0115203 A1 | 5/2010 | White |
| 2010/0238919 A1 | 9/2010 | Froelich |
| 2010/0250860 A1 | 9/2010 | Potnis et al. |
| 2010/0262948 A1 | 10/2010 | Melski et al. |
| 2010/0274875 A1 | 10/2010 | Banno et al. |
| 2010/0333080 A1 | 12/2010 | Keys et al. |
| 2011/0113068 A1 | 5/2011 | Ouyang et al. |
| 2011/0314048 A1 | 12/2011 | Ickman et al. |

* cited by examiner

Object Update Table 136

| Object Update Record 231 | |
|---|---|
| Object ID | 232 |
| Object Version Info | 234 |
| Object Update Pending Flag (in-memory) | 236 |
| Object Update Done Flag (in-memory) | 238 |
| Source Client ID (optional) | 240 |
| Payload@version_a (optional) | 242-a |
| ... | |
| Payload@version_z (optional) | 242-z |
| Client 1 | 244-1 |
|   Client ID | 246 |
|   (Un)Registered Sequence Number(s) | 248 |
| ... | |
| Client N | 244-N |

FIG. 2B

Client-Object Registration Table 134

| Client-Object Registration Record 201 | |
|---|---|
| Client ID | 202 |
| Registration Status | 204 |
| Object Reg. Pending Flag (in-memory) | 206 |
| Object Reg. Done Flag (in-memory) | 208 |
| Client Heartbeat Timestamp | 209 |
| Object 1 | 210-1 |
|   Object ID | 211 |
|   Sequence Number | 212 |
|   Server-Side Version Info | 214 |
|   Client-Side Version Info | 216 |
|   Object Update Complete Flag (in-memory) | 218 |
|   Payload Filters (optional) | 220 |
| ... | |
| Object N | 210-N |

FIG. 2A

Server-Side Object Update Feed Record 270

| Object Update Feed Record | |
|---|---|
| Object ID | 272 |
| Object Version Info | 274 |
| Source Client ID (optional) | 276 |
| Payload (optional) | 278 |
| ... | |

FIG. 2D

Client-Side Object State Table 250

| Object State Record 251 | |
|---|---|
| Client ID (provided by server) | 252 |
| Session Token (provided by server) | 254 |
| Sequence Number | 256 |
| Object 1 | 258-1 |
|   Object ID | 260 |
|   Registration Flag | 262 |
|   Version Info | 264 |
|   Incremental Payload(s) (optional) | 266 |
| ... | |
| Object N | 258-N |

FIG. 2C

METHOD AND SYSTEM FOR DELIVERING OBJECT UPDATE MESSAGES INCLUDING PAYLOADS

PRIORITY

This application claims priority under 35 U.S.C. 119(e) to U.S. Provisional Patent Application No. 61/389,160 filed Oct. 1, 2010, which is hereby incorporated by reference in its entirety.

TECHNICAL FIELD

The disclosed embodiments relate generally to a client-server network environment, and in particular, to a system and method for delivering object update messages including payloads.

BACKGROUND

Object caching is a network technology used by web-based services in modern distributed systems for reducing latency, supporting disconnected operations, and improving user experience. This technology is becoming more popular with the increasing use of mobile devices such as smartphones and the development of cloud computing technology. Moreover, it is becoming a reality that a user of a web-based service often owns multiple terminals such as a desktop, a laptop, a tablet, a smartphone, etc., and the user can choose any of the terminals for accessing the service at any moment. This situation poses a significant challenge for object caching on how to keep objects cached at different terminals up-to-date. For example, if a user updates his or her calendar from a mobile phone, then the calendar cached at a desktop will be stale and must be updated accordingly. In those distributed systems involving hundreds of millions of users and trillions of objects, this is a non-trivial task.

SUMMARY

In accordance with some embodiments described below, a computer-implemented method in a distributed network system is disclosed. The distributed network system includes at least one server having memory and one or more processors, wherein the server has access to, respectively, a plurality of client-object registration records, each record including a client identifier, an object identifier, and a pair of server-side object version and client-side object version associated with the object identifier, and a plurality of object update records, each record including an object identifier and a plurality of incremental payloads, each incremental payload corresponding to a respective object version. The computer-implemented method includes: selecting a first client-object registration record including a first client identifier and a first object identifier; retrieving a pair of server-side object version and client-side object version from the first client-object registration record; determining a first set of incremental payloads to be delivered to a first client device associated with the first client identifier in accordance with the pair of server-side object version and client-side object version; retrieving the first set of incremental payloads from a first object update record including the first object identifier; and sending a first object update message to the first client device, wherein the first object update message includes the first object identifier, the server-side object version and the retrieved first set of incremental payloads.

In accordance with some embodiments described below, a server system in a distributed network system is disclosed, the server system having one or more processors for executing programs and memory to store data and to store one or more programs to be executed by the one or more processors. The server system has access to, respectively, a plurality of client-object registration records, each record including a client identifier, an object identifier, and a pair of server-side object version and client-side object version associated with the object identifier, and a plurality of object update records, each record including an object identifier and a plurality of incremental payloads, each incremental payload corresponding to a respective object version. The one or more programs include instructions for: selecting a first client-object registration record including a first client identifier and a first object identifier; retrieving a pair of server-side object version and client-side object version from the first client-object registration record; determining a first set of incremental payloads to be delivered to a first client device associated with the first client identifier in accordance with the pair of server-side object version and client-side object version; retrieving the first set of incremental payloads from a first object update record including the first object identifier; and sending a first object update message to the first client device, wherein the first object update message includes the first object identifier, the server-side object version and the retrieved first set of incremental payloads.

In accordance with some embodiments described below, a non-transitory computer readable-storage medium storing one or more programs for execution by one or more processors of a server system is disclosed, the server system having access to, respectively, a plurality of client-object registration records, each record including a client identifier, an object identifier, and a pair of server-side object version and client-side object version associated with the object identifier, and a plurality of object update records, each record including an object identifier and a plurality of incremental payloads, each incremental payload corresponding to a respective object version. The one or more programs include instructions for: selecting a first client-object registration record including a first client identifier and a first object identifier; retrieving a pair of server-side object version and client-side object version from the first client-object registration record; determining a first set of incremental payloads to be delivered to a first client device associated with the first client identifier in accordance with the pair of server-side object version and client-side object version; retrieving the first set of incremental payloads from a first object update record including the first object identifier; and sending a first object update message to the first client device, wherein the first object update message includes the first object identifier, the server-side object version and the retrieved first set of incremental payloads.

In accordance with some embodiments described below, a computer-implemented method in a client device is disclosed, wherein the client device has memory and one or more processors, wherein the client device includes a client-cached object and a client-cached object state record including an object identifier, a first application-based object version, and a first update-based object version. The computer-implemented method includes: receiving an object update message from an object update server, wherein the object update message includes a second application-based object version and a second update-based object version; determining, respectively, a first order defined by the first and second application-based object versions and a second order defined by the first and second update-based object versions; if the first order is not consistent with the second order: sending an object deregistration request including the object identifier to the object update server; and retrieving an object associated with the object identifier from an application server to replace the client-cached object, wherein the retrieved object includes a latest application-based object version.

In accordance with some embodiments described below, a client device is disclosed, wherein the client device includes a client-cached object and a client-cached object state record including an object identifier, a first application-based object version, and a first update-based object version. The client device includes one or more processors for executing programs and memory to store data and to store one or more programs to be executed by the one or more processors. The one or more programs include instructions for: receiving an object update message from an object update server, wherein the object update message includes a second application-based object version and a second update-based object version; determining, respectively, a first order defined by the first and second application-based object versions and a second order defined by the first and second update-based object versions; if the first order is not consistent with the second order: sending an object deregistration request including the object identifier to the object update server; and retrieving an object associated with the object identifier from an application server to replace the client-cached object, wherein the retrieved object includes a latest application-based object version.

In accordance with some embodiments described below, a non-transitory computer readable-storage medium storing one or more programs for execution by one or more processors of a client device is disclosed, wherein the client device includes a client-cached object and a client-cached object state record including an object identifier, a first application-based object version, and a first update-based object version. The one or more programs include instructions for: receiving an object update message from an object update server, wherein the object update message includes a second application-based object version and a second update-based object version; determining, respectively, a first order defined by the first and second application-based object versions and a second order defined by the first and second update-based object versions; if the first order is not consistent with the second order: sending an object deregistration request including the object identifier to the object update server; and retrieving an object associated with the object identifier from an application server to replace the client-cached object, wherein the retrieved object includes a latest application-based object version.

BRIEF DESCRIPTION OF DRAWINGS

The aforementioned embodiment of the invention as well as additional embodiments will be more clearly understood as a result of the following detailed description of the various aspects of the invention when taken in conjunction with the drawings. Like reference numerals refer to corresponding parts throughout the several views of the drawings.

FIGS. 2A to 2D are block diagrams illustrating data structures used by the distributed network system for distributing object updates in accordance with some embodiments.

DESCRIPTION OF EMBODIMENTS

Figure 1:
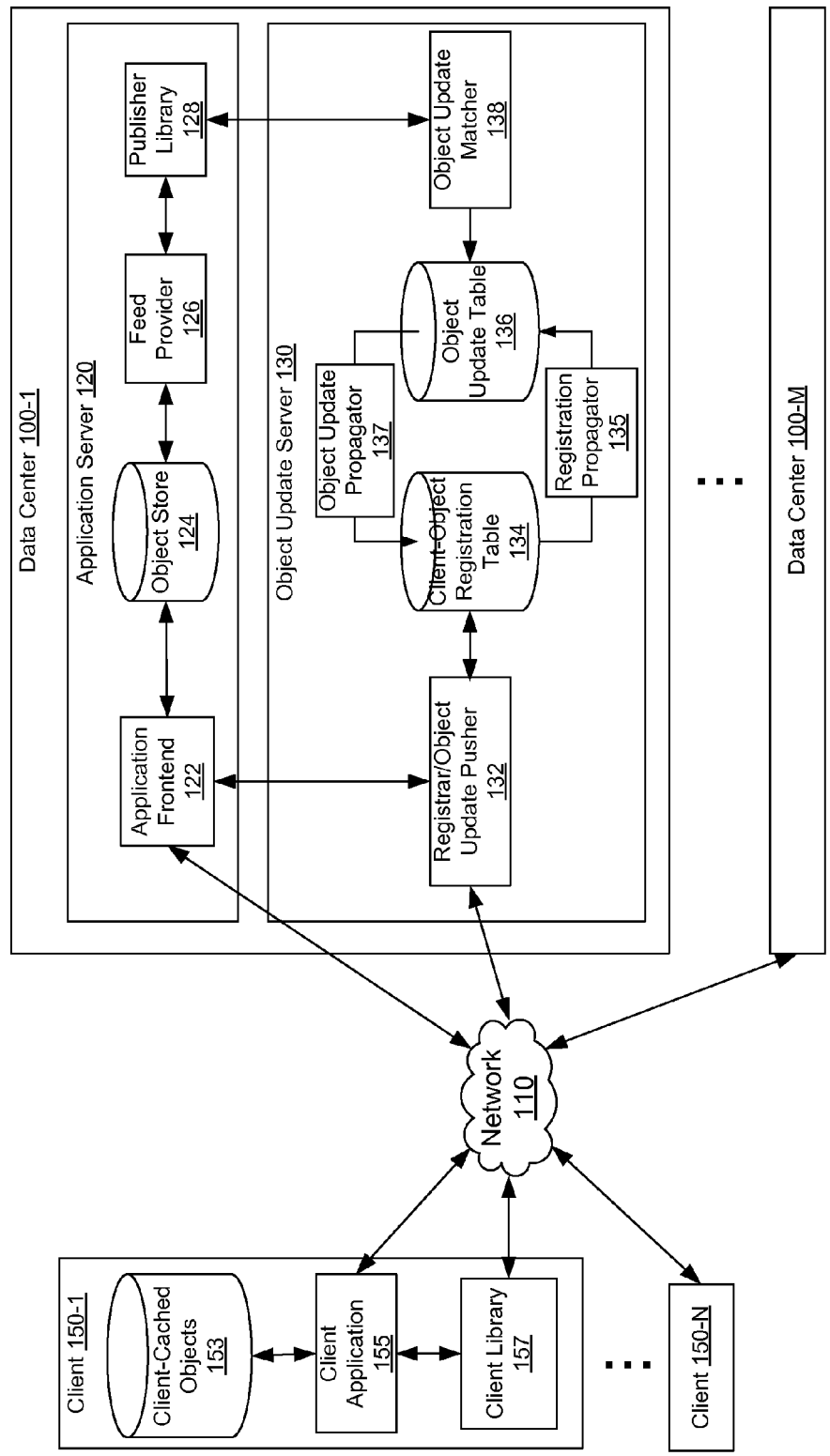
FIG. 1 is a block diagram illustrating a distributed network system for distributing object updates in accordance with some embodiments.

Reference will now be made in detail to embodiments, examples of which are illustrated in the accompanying drawings. While the invention will be described in conjunction with the embodiments, it will be understood that the invention is not limited to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

According to some embodiments, the present invention is directed to a large-scale object cache update system. It is designed to keep objects cached at the client devices up to date with a data repository in a distributed network system. At a high level, the system is configured to consume a feed of object updates from the data repository and disseminate the object updates to the appropriate client devices based on what objects a respective client device has cached and registered for receiving the corresponding object updates. One skilled in the art would understand that the terms including "object update," "object change," and "object invalidation" appearing in similar contexts have substantially the same meaning and are interchangeable with each other throughout this specification.

In some embodiments, a client device (also referred to as "a client" in this application) corresponds to a client-side laptop/desktop/tablet computer or a portable communication device such as a smartphone or a server-side computer running an application. Note that the system can be used by an application (e.g., a web-based service) that has hundreds-of-millions of client devices (many of which may be disconnected from the network at any given time) and trillions of objects such that any client may cache a large number of objects and the same object may be cached by many clients simultaneously.

Throughout this application, the term "object" refers to a piece of uniquely-identifiable, versioned data. For example, a user's web-based calendar may be considered as an object. A user's bookmarks associated with a browser application can also be modeled as an object. Using the web-based calendar as an example, when the user accesses the web-based calendar from a mobile phone, the mobile phone downloads a copy of the calendar from a remote server and caches the object in a storage device of the mobile phone (e.g., the phone's memory device). Similarly, if the user accesses the web-based calendar from a desktop computer, the computer downloads a copy of the calendar from the remote server and caches the object in a storage device of the desktop computer. By caching the calendar at the client device, the user has the benefit of accessing the calendar even if the client device is disconnected from the network (e.g., the Internet). In some embodiments, the cached calendar is stored in a client device's permanent storage device such that it is even available for user access after the device is rebooted.

A potential issue with the object caching approach is that a cached calendar at a first client device may become stale if a user adds a new appointment to the calendar from a second client device, which has not yet arrived at the first client device. To avoid this issue, all the other client devices that cache the calendar need to have the calendar's latest version including the new appointment as soon as possible. Note that a client-cached object does not have to be exclusively available for an individual user. In some embodiments, an object may be shared by multiple users but the issue remains the same in term of propagating an object update initiated by one user from one client device to the other client devices used by others.

In some embodiments, the object cache update system is designed to meet the following requirements:
1. High scalability for managing a large number of client devices and objects. The system is able to support hundreds of millions of users with each user, on average, having 3 to 4 client devices (including desktop, phone, notebook/netbook, etc). Furthermore, tens of thousands of objects such as documents, electronic messages, address books, calendars, and bookmarks may be cached at a client device, which require a significant amount of state data to track their updates.
2. High object update rate across applications. Note that applications such as web-based email and address book may have very high update rates (e.g., in tens of thousands per second), which may be even higher if a single set of servers is used for supporting multiple applications. In some embodiments, the system can handle an aggregate incoming object update rate of 100,000 queries-per-second (QPS) or even higher.
3. Handling disconnected clients appropriately. It is common that many client devices may be disconnected from cache update for hours, days or even weeks. To deal with this phenomenon, the system is developed such that an object update server implementing the system knows not only what to be delivered to a client device after being reconnected but also when to make the delivery. In some embodiments, after determining that a client device is gone forever (e.g., the client device may be reformatted), the object update server is configured to perform garbage collection for those object updates that are yet to be delivered to the client device to free the resources for other client devices.
4. A guarantee of delivering object updates to clients. The object update server of the present application is designed such that, once a client device has registered for receiving updates to an object, it is guaranteed to eventually receive at least the most recent update to the object as long as the client device is not permanently disconnected. Note that this guarantee simplifies the development of applications that use the object update server. For example, an application does not have to provide a path for pushing/polling the object updates from the object update server, thereby simplifying the application's code base.

As a system for determining which objects cached at which clients are outdated and then delivering object updates to them appropriately, the object update server is configured to implement the following features:
1. Tracking and delivery: The object update server tracks objects cached at respective client devices and propagates each update to an object to the client devices that have cached the object and registered for receiving updates to the objects.
2. Reliability of object cache updates: The object update server provides an incremental object update stream and combines multiple updates for the same object when possible so that a client device can safely bypass the object's intermediate stages.
3. Low latency: The object update server routes object updates to the appropriate clients within, e.g., seconds of receiving them, which is sufficient for most collaborative applications that do not require sub-second latency. In some embodiments, the server uses batched blind writes/reads/table scans for optimized throughput to further reduce the latency. As will be described below, the latency can be further reduced with an in-memory/caching component built into the system.

FIG. 1 is a block diagram illustrating a distributed network system 10 for propagating object updates between clients 150 and data centers 100 in accordance with some embodiments including those embodiments depicted in FIGS. 1A to 1F of U.S. Provisional Patent Application No. 61/389,160. The distributed network system 10 includes a plurality of clients (150-1, . . . , 150-N) and a plurality of data centers (100-1, . . . , 100-M), which are communicatively coupled to the plurality of clients through a communication network 110. Communication network(s) 110 can be any wired or wireless local area network (LAN) and/or wide area network (WAN), such as an intranet, an extranet, the Internet, or a combination of such networks. In some embodiments, communication network 110 uses the HyperText Transport Protocol (HTTP) and the Transmission Control Protocol/Internet Protocol (TCP/IP) to transport information between different networks. The HTTP permits client devices to access various information items available on the Internet via the communication network 110. For example, the "hanging GET" request supported by HTTP 1.1 is used for transmitting new messages from a server to a client. Because the client keeps a GET pending at the server, whenever there is a message to be sent, the server can simply "reply" to the client with the message. Other communication protocols that can be used by the communication network 110 include the Extensible Messaging and Presence Protocol (XMPP). The various embodiments, however, are not limited to the use of any particular protocol. The term "information item" as used throughout this specification refers to any piece of information or service that is accessible via a content location identifier (e.g., a URL or URI) and can be, for example, a web page, a website including multiple web pages, a document, a video/audio stream, a database, a computational object, a search engine, or other online information service.

As shown in FIG. 1, a client 150-1 includes a client application 155 and a set of client-cached objects 153 associated with the client application 155. For example, the client application 155 may be a web browser application for accessing Internet-based services and the set of client-cached objects 153 may include a set of bookmarks associated with the web browser, an address book and email messages associated with a web-based email application running through the web browser, and a set of appointments associated with a web-based calendar application running through the web browser. In some other embodiments, the client application 155 is a software program dedicated to a particular application or applications such as a web-based chat room and the client-cached objects 153 may include a set of instant messages associated with the chat room.

In some embodiments, the client 150-1 further includes a client library 157 for handling transactions relating to updates to the client-cached objects 153 or other client-related transactions. As will be described below, the client library 157 includes one or more software modules, which help register a particular object at an object update server 130 within the data center 100-1 as well as receiving, processing, and notifying the client application 155 of updates directed to the object. In some embodiments, the client library 157 may be a component (e.g., a plug-in) of the client application 155. In this case, the client library 157 may use the client application 155's communication channel for communicating with the data centers (100-1, . . . , 100-M). In some other embodiments, the client library 157 is a standalone application that may have its own communication channel with the data centers (100-1, . . . , 100-M). The client library 157, like the client application 155, may be implemented in any programming languages including Java, Javascript, C++, etc. For illustration, two separate double-arrow lines are depicted in FIG. 1 as connecting the client application 155 and the client library 157 to the communication network 110, respectively and these two lines may or may not represent two distinct communication channels.

In order to support a large number of client devices that may be deployed across the world, the distributed network system 10 may include multiple data centers at different locations. FIG. 1 illustrates that one of the data centers 100-1 includes an application server 120 and an object update server 130. These two servers represent two types of server-side applications. The application server 120 provides a web-based service (e.g., calendar) to the clients (150-1, . . . , 150-N). It includes an application frontend 122 for interacting with the clients and stores different users' calendars in an object store 124 (which may be a database application associated with the application server 120). In addition, the application server 120 includes a feed provider 126 that has access to the object store 124 and communicates object updates (including insertions, deletions, and modifications) to the object update server 130. In some embodiments, the application server 120 and the object update server 130 each may run on one or more server computers. In some other embodiments, the two types of applications may run on the same set of servers. One skilled in the art would understand that the configuration shown in FIG. 1 is for illustration and it does not restrict the implementation of the present application in any way.

In some embodiments, the object update server 130 includes a registrar 132 for receiving object registration requests from the clients 150 and storing them in a data structure called "client-object registration table" 134. The registrar 132 keeps track of the contents within each client device's cache, i.e., which objects the client is device registered for and the object versions cached by the client device. In some embodiments, it also maintains an eventually-consistent cache of the objects' latest versions known to the object update server 130. A more detailed description of the client-object registration table 134 is provided below in connection with FIG. 2A. One skilled in the art would understand that the terms including "request," "message," "alert," and "notification" appearing in similar contexts have substantially the same meaning and are interchangeable with each other throughout this specification. In addition, the registrar 132 acts as an object update pusher for pushing an object update to a respective client that has registered for receiving updates to the object if the object cached by the client is deemed to be stale. In some embodiments, the registrar/object update pusher 132 uses the application server 120's communication channel with the communication network 110 for receiving object registration requests from the clients 150 or pushing object update messages to the clients 150 through, e.g., the application frontend 122. In some other embodiments, the registrar/object update pusher 132 has its own communication channel with the communication network 110.

In some embodiments, the object update server 130 includes an object update matcher 138 that acts as an interface of the object update server 130 to the application server 120 for receiving object updates from the application server 120 and storing the object updates in a data structure called "object update table" 136. The object update matcher 138 maintains the mapping from an object ID to the latest version known for that object by the object update server 130. In some embodiments, it maintains an eventually-consistent cache of client devices registered for each object. A more detailed description of the object update table 136 is provided below in connection with FIG. 2B. As shown in FIG. 1, in some embodiments, the object update sever 130's interface with the application server 120 is an extension of the object update matcher 138 that resides in the application server 120, i.e., a publisher library 128. The object update server 130 provides a predefined set of call and callback functions for the object update matcher 138 and the feed provider 126 to exchange information through the publisher library 128. For example, the publisher library 128 is provided to the feed provider 126 for making an object update method call to the object update server 130. When the call returns successfully (via a callback), the object update server 130 guarantees that the object update will be delivered to the respective client devices eventually. In some embodiments, both calls are asynchronous, i.e., the return values are actually provided by a callback. The application server 120 (e.g., the feed provider 126) makes the call repeatedly until it receives a successful confirmation.

In some embodiments, the object update server 130 synchronizes information stored in the client-object registration table 134 with information stored in the object update table 136 using batched read and write operations on the two tables 134 and 136. For example, a registration propagator 135 is configured to scan the client-object registration table 134 or an in-memory bitmap for identifying new or recently-updated client-object registration records and then use the identified client-object registration records to update the affected object update records in the object update table 136 according to a first predefined schedule. An object update propagator 137 is configured to scan the object update table 136 or an in-memory bitmap for identifying new or recently-updated object update records and use the identified object update records to update the affected client-object registration records in the client-object registration table 134 according to a second predefined schedule that is independent from the first predefined schedule. As such, the registrar/object update pusher 132's interaction with the client-object registration table 134 does not depend on the object update matcher 138's interaction with the object update table 136 and vice versa. In some embodiments, there is an optimized "fast path" between the matcher 138 and the registrar 132 that allows an object update to bypass the object update table 136, the object update propagator 137, and the client-object registration table 134 and be sent directly from the matcher 138 to the registrar 132 such that the registrar 132 can immediately send the object updates to the relevant client devices. Although FIG. 1 depicts a single box for each of the registrar 132 and the matcher 138, one skilled in the art would understand that there may be multiple registrars and matchers running in the same object update server 130. In some embodiments, the matchers and registrars are stateless and load-balanced through a sharding process such that any of these server-side modules can handle a request meant for that type of server-side module.

As will be described below, the system configuration of the present application improves the efficiency and scalability of the object update server 130 for dealing with billions of client devices and trillions of objects by avoiding synchronous replication that imposes a significant latency cost and dependence on replication correctness, which may fail completely. Moreover, this system configuration supports batched operations (e.g., table reads and table writes) to persistent storage, a loose coupling between the different servers and their associated operations, and movement of client affiliations from one data center to another data center.

Different components of the object update server 130 work collectively to track a set of clients 150, each client having registered for receiving updates to a predefined set of objects. For example, the clients 150 use the register/deregister calls (or messages) to express interest/disinterest in particular objects. After the object update server 130 is notified by the application server 120 of a latest version of an object via an object update message, it determines which of the clients 150 that have registered for receiving updates to the object have an older version of the object than the latest version specified in the object update message and sends the corresponding object update notification messages to these clients 150. Subsequently, a respective client 150-1 acknowledges the receipt of a corresponding object update notification message by returning a confirmation message to the object update server 130, thereby ensuring that the object update is reliably delivered.

For example, if the client 150-1 successfully registers with the object update server 130 for an object X's version V, the object update server 130 guarantees that the client 150-1 will be informed if any object update occurs to the object X with a more recent version V' than V. In some embodiments, the version V in the object registration request is the latest version known to the client 150-1 at the time of registration. If no version information is provided by the client 150-1, the object update server 130 uses the object's latest version known to the object update server 130 for the client 150-1's registration request. Note that the object update server 130 may learn the object's latest version from another client 150-N that has already registered for the same object. Alternatively, the object update server 130 may get the object's latest version information from the application server 120. In some embodiments, there is no known version for an object, in which case a special symbol called "unknown version" is used to inform a client 150-1 that the client 150-1 needs to retrieve the object irrespective of what version is currently cached by the client.

As described above, the object update server 130 guarantees that after a client 150-1 has registered for an object, it will be notified of subsequent updates to that object. This delivery guarantee allows the other applications that rely upon the object update server 130 for maintaining cache coherency to have a more simplified design and implementation, e.g., being freed from implementing a polling path for retrieving object update messages in their code base.

Note that the object update server 130's guarantee provides the application developers with flexibility, simplicity, and efficiency in the implementation without comprising the ultimate accuracy even in the situation that the object update server 130 may drop, reorder object updates, or deliver the same object update multiple times due to network congestion. For example, an object X may be modified twice within a short time period to create a first version $V_1$ and then a second version $V_2$. In this case, the object update server 130 may automatically bypass the delivery of the object update associated with the first version $V_1$ and only deliver the object update associated with the second version $V_2$. In some embodiments, the object update server 130 may deliver the updates for a particular object in an order other than that in which the object updates were generated. For example, if an object Y has four consecutive versions $V_1$, $V_2$, $V_3$, $V_4$, the object update server 130 may deliver them in the reverse order $V_4$, $V_3$, $V_2$, $V_1$.

As noted above, various data structures are used by different components of the distributed network system 10 to perform the designated operations to maintain the cache coherency between the clients 150 and the data centers 100. FIGS. 2A to 2D are block diagrams illustrating some of the data structures for distributing object updates in accordance with some embodiments.

In particular, FIG. 2A depicts an exemplary client-object registration table 134 that is used by the object update server 130 (e.g., the registrar 132) for tracking the object registration status for the clients. The exemplary client-object registration table 134 includes one or more client-object registration record 201. Each record 201 includes a client ID 202, a registration status 204, an object registration pending flag 206, an object registration done flag 208, a client heartbeat timestamp 209, and one or more object records (210-1, . . . , 210-N). In some embodiments, the client ID 202 is a unique parameter that the object update server 130 assigns to a respective client device in response to, e.g., the first object registration request from the client device. In some embodiments, the client ID 202 is provided by the application server 120 based at least in part on a unique parameter associated with the client device (e.g., its IP address). The unique parameter associated with the client device can be used by the object update server 130 to avoid sending an object update to a client device from which the object update originates.

The registration status 204's value indicates whether the client 150-1 is still "alive" or has been marked as "dead." For example, upon receipt of a registration request from a new client device, the registrar 132 generates a new record in the table 134 and the record's registration status is set to be "Yes," indicating that the client device is active in receiving object updates. But the object update server 130 may invoke a background process to change the record's registration status from "Yes" to "No," indicating that the client device is now deemed to be gone forever for not contacting the object update server 130 for a predefined amount of time (e.g., ranging from one week to multiple months). In some embodiments, a garbage collector in the object update server 130 scans the table 134 after a predefined time interval to remove the client-object registration records having a registration status of "No" to free the resources for other use.

As noted above, the registration propagator 135 is responsible for propagating new registrations from the table 134 to the table 136. To help the registration propagator 135 quickly identify new registrations in the table 134, the registrar 132 sets the object registration pending flag 206 to be a non-null value when it receives a new object registration request from a corresponding client device. In some embodiments, the non-null value is a sequence number provided by the client device or a timestamp associated with the object registration request. In some embodiments, the object update server 130 maintains, e.g., a bitmap in its memory for storing a compressed version of the object registration pending flags in the client-object registration table 134. The registration propagator 135 scans the in-memory bitmap to identify those new object registrations in the table 134. After propagating the new object registrations from the client-object registration record 201 to the corresponding entries in the table 136, the registration propagator 135 resets the record's object registration pending flag 206 to null, which remains to be null until the registrar 132 receives the next object registration request from the same client device.

The object registration done flag 208 is used in a multi-datacenter configuration to ensure that a client device's object registration request arriving at one data center will be securely propagated to another data center. A more detailed description of this process is provided below in connection with FIG. 5A. The client heartbeat timestamp 209 is used by the object update server 130 to track the client device's online status. In some embodiments, a client device 150-1 (e.g., its client library 157) sends a heartbeat signal to the object update server 130 or another module within the data center 100-1 at a predefined frequency (e.g., every few minutes). In response to the heartbeat signal, the object update server 130 (e.g., a background process managed by the object update server 130) updates the client heartbeat timestamp 209 to indicate that the client device is online. In some embodiments, the same process or another one checks the client heartbeat timestamps of the client-object registration records in the table 134 according to a predefined schedule to determine which client devices are still online and which are not. For those client devices that are deemed to be offline beyond a predefined time period (according to their associated client heartbeat timestamps), their registration status is changed from "Yes" to "No" for future garbage collection purpose.

An object record 210-1 further includes an object ID 211 that uniquely identifies an object (e.g., a particular user's calendar account or email account) associated with the client ID 202, an object registration sequence number 212, server-side version information 214, client-side version information 216, an object update complete flag 218, and one or more payload filters 220. In some embodiments, the size of an object ID is between 8 bytes and 256 bytes. The object registration sequence number 212 is an attribute indicating whether the client device (de)registers with the object update server 130 for receiving updates to the object associated with the object ID 211. In some embodiments, the sequence number 212 is a monotonically-increasing parameter provided by the client device or a timestamp associated with the object (de)registration request so that a request having a higher sequence number or a more recent timestamp always overrides another request having a lower sequence number or a less recent timestamp. In some embodiments, the sequence number 212 is a monotonically-increasing parameter provided by the registrar 132.

In some embodiments, this monotonically-increasing parameter allows a propagator to blindly write entries of a table so as to avoid the use of transactions like the read-modify-write cycle. The batched reads or writes operations to the same table support better resource usage. For example, assume that a client device submits a deregistration request for an object at sequence number 32 (which is equivalent to a timestamp since both are monotonically increasing) and then submits a re-registration request for the same object at sequence number 45. The object update propagator 137 would not be confused by such transaction because it only considers the request with the higher sequence number. In this case, the client device is considered registered for that object even if these two messages were reordered (e.g., 45 arrived before 32) because the second message is automatically ignored for having a lower sequence number.

The server-side version information 214 indicates the object's latest version that the object update server 130 is aware of (e.g., as a result of information propagation from the table 136 to the table 134 by the object update propagator 137) and the client-side version information 216 indicates the object's latest version that a client device is aware of (e.g., as part of the object registration request submitted by the client device). In some embodiments, the object update pusher 132 compares these two attributes to determine whether it needs to push an object update message to the client device. If the two attributes are different, the object update pusher 132 generates an object update message including the server-side version information and sends the message to the client device.

In some other embodiments, the object update propagator 137 sets the object update complete flag 218 to be "No" when updating the server-side version information 214 in response to an object update directed to the pair of client ID 202 and the object ID 211. Sometimes, the object update propagator 137 may set the object update complete flag 218 to be a simplified or compression copy of the server-side version information 214. In this case, the object update pusher 132 no longer needs to compare the attributes 214 and 216. By querying the object update complete flag 218, the object update pusher 132 is able to determine whether it should generate an object update message for the client-object pair and resets the object update complete flag 218 to be "Yes" after generating the message. In some embodiments, the object update server 130 maintains, e.g., a bitmap in its memory for storing a compressed version of the object update complete flags in the client-object registration table 134. The object update pusher 132 can scan the in-memory bitmap to identify those clients that should be notified of the object updates that they have registered previously.

As will be described below in connection with FIG. 6C, the payload filters 220 are used by the object update pusher 132 for filtering out those contents from payloads that are scheduled to be delivered to a client device as part of or in connection with an object update message.

FIG. 2B depicts an exemplary object update table 136 that is used by the object update server 130 (e.g., the object update matcher 138) for managing the object updates targeting at the respective clients. The object update table 136 includes one or more object update record 231. Each record 231 includes an object ID 232, object version information 234, an object update pending flag 236, an object update done flag 238, a source client ID 240, one or more incremental payloads (242-a, . . . , 242-z), and one or more client records (244-1, . . . , 244-N). The object version information 234 indicates the object's latest version that the object update server 130 is aware of (which may come from the application server 120 through the publisher library 128), which, when migrated from the table 136 to the table 134, triggers the object update pusher 132 to send out object update messages to the affected client devices. The object update pending flag 236 is similar to the object registration pending flag 206 except that the object update pending flag 236 is used by the object update propagator 137 for propagating the object version information 234 from the table 136 to the table 134. The object update done flag 238, like the object registration done flag 208, is used in a multi-datacenter configuration to ensure that an object update message arriving at one data center will be securely propagated to another data center. A more detailed description of this process is provided below in connection with FIG. 5A.

The source client ID 240 identifies a source client device from which a user makes an update to an object (e.g., adding a new appointment to his or her calendar application). Since the client device is the source of this object update, there is no need for the object update server 130 to send a message to this client device. Each of the incremental payloads is a data item including the changes to an object made by a user, such as newly-added contents and deletion/modification of existing contents. As will be described below in connection with FIGS. 6A and 6B, the possession of these incremental payloads by a respective client device frees the client device from synchronizing with the application server 120 after receiving an object update message. Each client record 244-1 includes a client ID 246 and a sequence number 248 derived from the most recent object (de)registration request from the client associated with the client ID 246. As will be explained below, this sequence number 248 allows the updates on the same object to be in an order as expected by the client even in the presence of the object updates re-ordering.

FIG. 2C depicts an exemplary client-side object state table 250 that is used by the client library 157 for tracking the status of registered objects at a respective client 150-1. The object state table 250 includes one or more object state records 251, each record including a client ID 252 that is associated with the client 150-1, a session token 254, a sequence number 256, and one or more object records (258-1, . . . , 258-N).

In some embodiments, the client ID 252 and the session token 254 are both provided by the data center 100-1 (e.g., the object update server 130 or the application server 120). A client device's client ID 252 remains the same when the client device migrates from one data center 100-1 to another data center 100-M. In contrast, the client device's session token 254 depends on the data center that the client device is currently registered with and it varies when the client device migrates from one data center 100-1 to another data center 100-M. As will be described below in connection with FIGS. 5A and 5B, the session token 254 enables the client device to successfully re-register with a new data center when the client device moves from one location to another location, which happens all the time for a mobile client such as a mobile phone. As noted above, the sequence number 256 is a monotonically-increasing number used by the client device to associate with each individual object (de)registration request. Note that the client device can use the sequence number 256 to keep the different objects cached by the client device correctly ordered because of the sequence number's monotonicity.

Each object record (258-1, . . . , 258-N) corresponds to a client-cached object that the client 150-1 has registered for receiving future updates to the object. In some embodiments, an object record 258-1 includes an object ID 260, a registration flag 262, version information 264, and one or more incremental payloads (266. As will be described below, the registration flag 262 may have one of multiple values: (i) "Registered" (or "R") for a completion of object registration, (ii) "Pending Registration" (or "PR") for an initiation of object registration, (iii) "Deregistered" (or "D") for a completion of object deregistration, and (iv) "Pending Deregistration" (or "PD") for an initiation of object deregistration.

FIG. 2D depicts an exemplary server-side object update feed record 270 that is used by the application server 120 for passing an object update to the object update server 130 in accordance with some embodiments. The object update feed record 270 includes an object ID 272 associated with an object (e.g., a user's calendar) managed by the application server 120, object version information 274 identifying the latest version of the object, a source client ID 276 identifying a client device from which the user makes the object update initially, and an incremental payload 278 including the changes to the object made by the user, such as newly-added contents and deletion/modification of existing contents.

As an object cache updating system, the distributed network system 10 performs at least two types of transactions for keeping an object cached at a client device up-to-date with an update to the object by another client device: (i) (de)registering at an object update server a client's request for receiving an update to a client-cached object, which is described below in detail in connection with FIGS. 3A to 3B; and (ii) propagating an object update from an application server to a set of clients that have registered for receiving updates to the object, which is described below in detail in connection with FIGS. 4A to 4C.

Figure 3A:
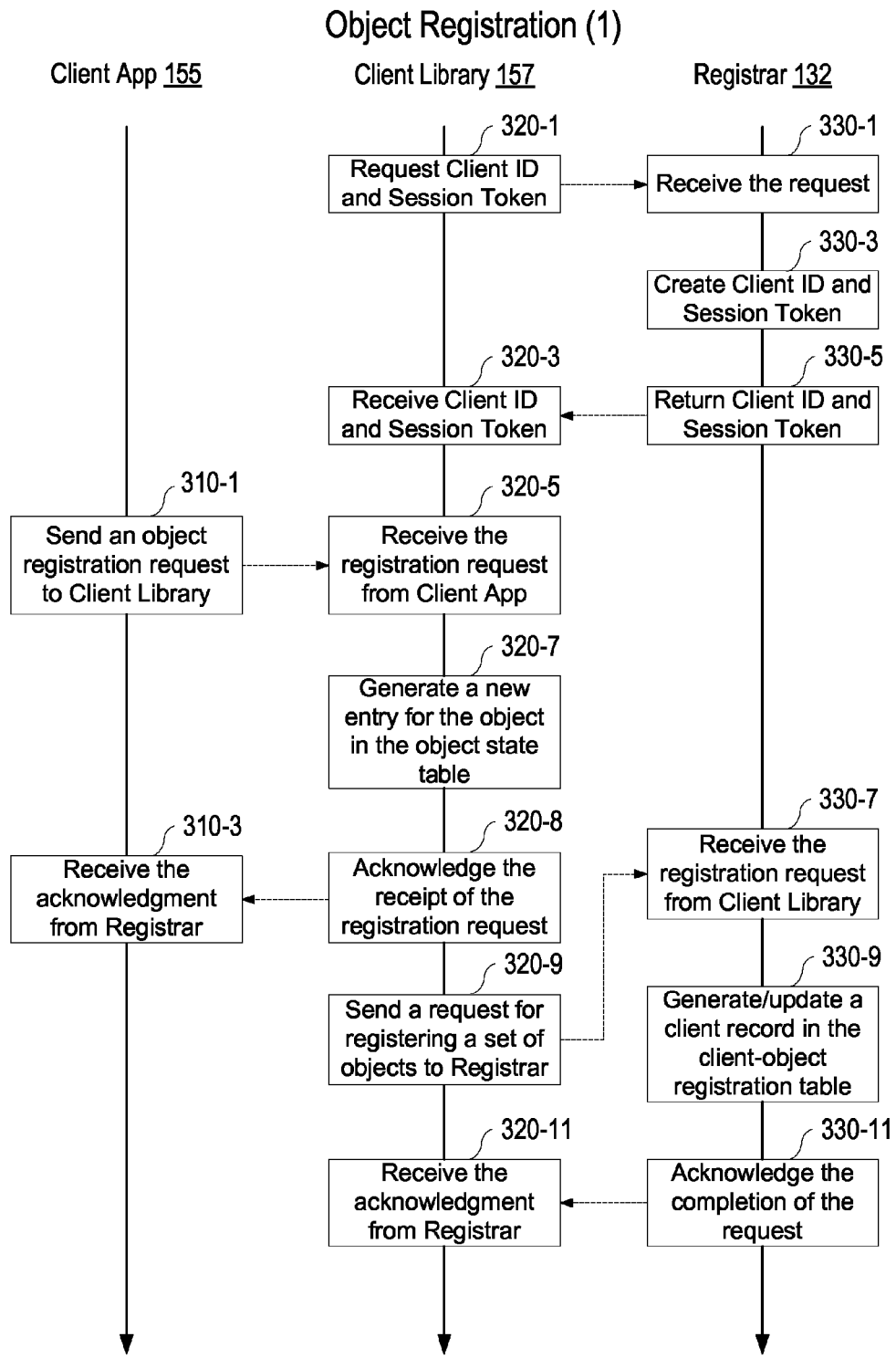
FIGS. 3A and 3B are flow charts illustrating how a client device communicates with an object update server for receiving future updates to an object cached by the client device in accordance with some embodiments.
Figure 3B:
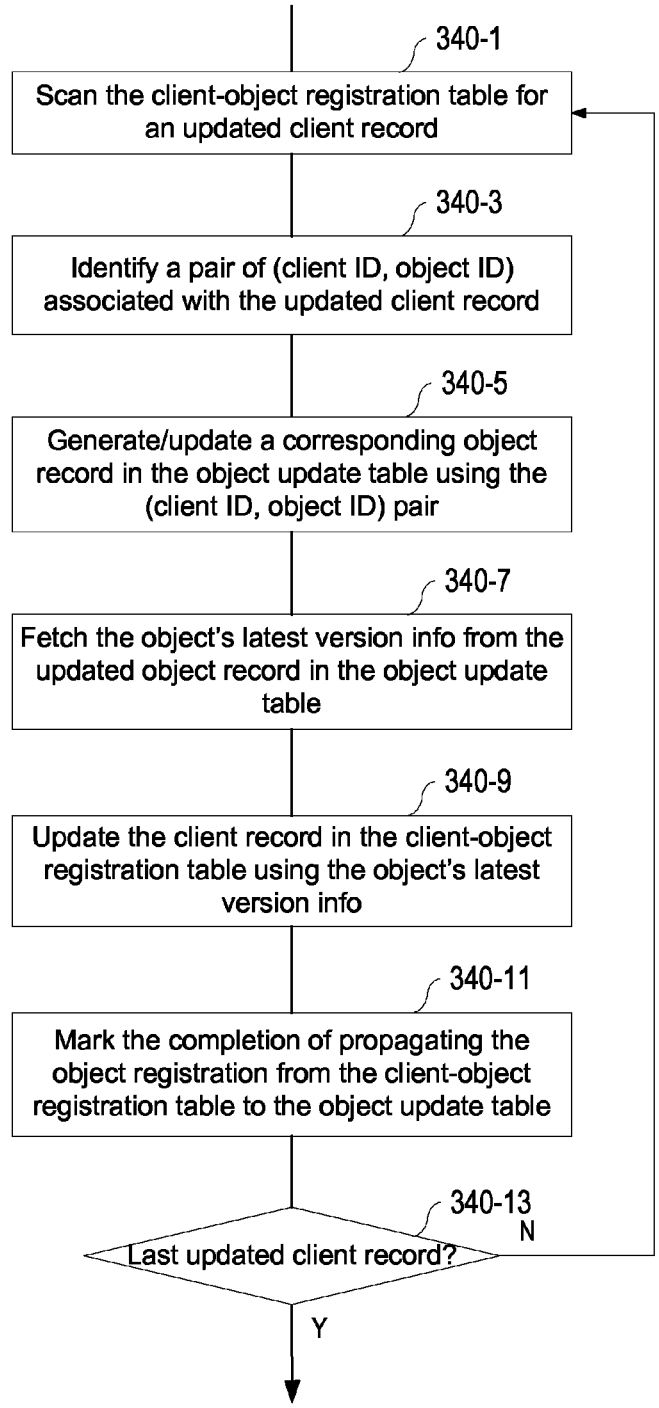

In particular, FIGS. 3A and 3B are flow charts illustrating how a client device 150-1 registers with an object update server 130 for receiving future updates to an object in accordance with some embodiments. Before processing any object registration request from the client application 155, the client library 157 sends (320-1) a request to the registrar 132 for a client ID and a session token. In some embodiments, the object update server 130 is responsible for determining these two parameters. Upon receipt of the request (330-1), the registrar 132 creates (330-3) a new client ID and a new token session and returns (330-5) the two parameters to the client library 157. In some embodiments, the registrar 132 may forward the request to the application server 120 for generating the two parameters or generate the two parameters based on the response from the application server 120. For example, the client device 150-1 may already have a unique client ID when accessing the application server 120. In this case, the same client ID can be used by the object update server 130 for identifying the same client device. After receiving (320-3) the client ID and session token, the client library 157 is ready for processing object (de)registration requests from the client application 155. For illustration, the description below focuses on processing an object registration request because the object deregistration request is treated similarly with little, if any, difference.

As shown in FIG. 3A, the client application 155 sends (310-1) an object registration request including an object ID to the client library 157. In some embodiments, the client application 155 makes a function call to the client library 157 for passing the object ID. In some embodiments, the request includes the object's current version known to the client application 155. Upon receiving (320-5) the registration request, the client library 157 writes the request into a pending object registration list. In some embodiments, the pending object registration list is stored in the client-side object state table associated with the client library 157. For a new object registration request, the client library 157 generates (320-7) a new entry in the table using the object's current version information and sets the entry's registration flag to be "PR", which the client library 157 may revisit to determine whether it needs to resend an object registration request to the registrar 132. Regardless of whether it has received the registration confirmation from the registrar 132, the client library 157 acknowledges (320-8) its receipt of the registration request to free the client application 155 for other transactions (310-3). In some embodiments, the client library 157 makes this acknowledgment by invoking a callback function provided by the client application 155. In connection with generating the new entry, the client library 157 generates a new sequence number for the object registration request. In some embodiments, the sequence number is a monotonically increasing number generated by the client library 157. In some other embodiments, the timestamp at which the client library 157 receives the request is used as the sequence number for the object registration request.

In some embodiments, the client library 157 sends (320-9) a request for registering a set of objects to the registrar 132 according to a predefined schedule. For example, the client library 157 may send out the request after it has accumulated a predefined number (e.g., 5) of registration and deregistration requests from the client application 155 or after a predefined time period (e.g., a second or less). In some other embodiments, the client library 157 may submit the request whenever it receives a new request from the client application 155. In some embodiments, this request includes a set of object IDs and a pair of (client ID, session token) associated with the client device. Upon receiving (330-7) the request from the client library 157, the registrar 132 generates (330-9) a new client record in the client-object registration table if, e.g., this is the first time that the registrar 132 receives an object registration request from this client device 150-1 according to the client ID and the session token or updates an existing client record in the client-object registration table if there is already a client row have the same client ID in the client-object registration table. In some embodiments, the registrar 132 sets the client record's object registration pending flag to be a non-null value (e.g., the sequence number associated with the object registration request). Next, the registrar 132 returns a message to the client library 157 acknowledging (330-11) the completion of the object registration request. Upon receipt (320-11) of the acknowledgment from the registrar 132, for each object in the object set, the client library 157 sets the corresponding entry's registration flag to be "R" to mark its receipt of confirmation from the registrar 132. In some embodiments, the client library 157 may delete the corresponding entry from the object state table 250 to mark its receipt of confirmation from the registrar 132. In some embodiments, the client library 157 performs the operation 320-9 for those entries having a registration flag of "PR" multiple times until it receives a reply from the registrar 132 or gives up the attempt to register the object with the object update server 130.

In some embodiments, the registrar 132 returns the object's latest version information known to the object update server 130 to the client library 157. The client library 157 then updates the pending object registration list using the received version information. For each object in the object set, the client library 157 replaces the corresponding entry's version information in the object state table with the one received from the registrar (if they are different). If the object's version information returned by the registrar 132 is more recent than the client-cached object, the client library 157 may optionally notify the client application 155 through a callback function. The client application 155 then synchronizes with the application server 120 (e.g., the application frontend 122) to receive the latest version of the object. In some other embodiments, the client application 155 is not notified that there is a more recent version of the object in connection with an object registration request. Instead, it will be notified after the registrar 132 pushes an object update to the client library 157 and the client application 155, which is described below in connection with FIG. 4B.

FIG. 3B depicts a flow chart illustrating how the registration propagator 135 migrates the object registration requests from the client-object registration table 134 to the object update table 136. Following a predefined schedule, the registration propagator 135 performs a batched scan (340-1) of the table 134 for an updated client-object registration record (including new client-object registration records) in the client-object registration table 134. In some embodiments, the registration propagator 135 actually scans an in-memory data structure (e.g., a data structure) for non-null object registration pending flags. From each updated client-object registration record having an non-null object registration pending flag, the registration propagator 135 identifies (340-3) a pair of (client ID, object ID) and generates (340-5) a new object update record or updates (340-5) an existing object update record in the object update table 136 using the pair of (client ID, object ID). For example, the registration propagator 135 identifies an object update record in the table 136 having the same object ID and adds a new entry to the object update record for the client ID. The new entry also includes the sequence number that the client library 157 generated for the object registration request.

Next, the registration propagator 135 fetches (340-7) the object's latest version information from the object update record and updates (340-9) the corresponding client-object registration record. In some embodiments, the registration propagator 135 identifies an object entry in the client-object registration record that has the object ID, replaces the object entry's server-side version information with the object's latest version information, and sets the object entry's object update complete flag to be "No" if the object entry's server-side version information is more recent than its client-side version information. As will be described below, the object update pusher 132 checks this flag to determine whether or not to generate an object update message for the object. In addition, the registration propagator 135 marks (340-11) the completion of propagating the object registration request from the table 134 to the table 136 by resetting the client record's object registration pending flag to a null value (including resetting the corresponding bit in the in-memory bitmap). The registration propagator 135 repeats (340-13, no) this process until after that it processes (340-13, yes) the last updated client-object registration record. The registration propagator 135 performs this batched table scan and table update independently from other components of the object update server 130. For example, neither the registrar 132 nor the matcher 138 will be halted because the registration propagator 135 has not yet propagated the recent object registrations from the table 134 to the table 136.

With the delivery guarantee described above, after the registrar 132 acknowledges the completion of a client device's object registration request (330-11), the updates to an object will be delivered to the client device for any later versions known to the object update server 130 but unknown to the client device. For example, if the client device has the version V of an object and the latest version V' of the object is more recent than V, the latest version V' will be propagated to the client-object registration record in the table 134. When the client device polls the object update server 130, this latest version V' will be delivered to the client device. Alternatively, suppose that the client device has the version V of the object and the latest version of the object known to the object update server 130 is also V. If an object update with a new version V' is delivered to the object update server 130 after the registrar 132 finishes processing the client device's registration request, the new version V' will still be propagated to the client-object registration record in the table 134 after the client device's client ID is identified in the table 136.

In some embodiments, a deregistration record in the table 134 acts like a tombstone, which prevents a delayed object registration request with a lower sequence number from re-registering the object with a higher sequence number without violating the object update delivery guarantee. A garbage-collection process clears these deregistration tombstones at a relatively slow interval.

Figure 4A:
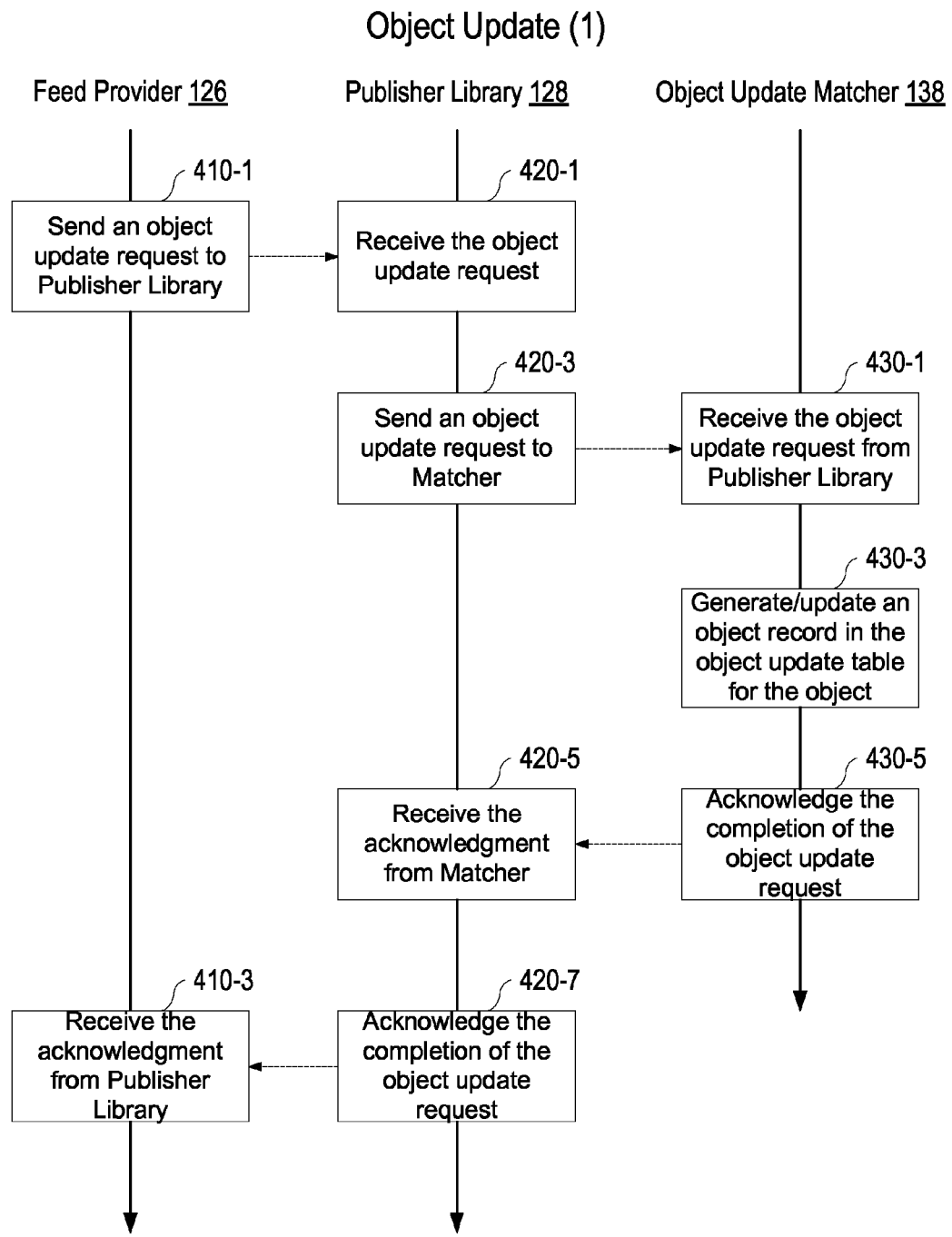
FIGS. 4A to 4C are flow charts illustrating how the object update server delivers to the client device an update to an object cached by the client device in accordance with some embodiments.

One goal of the object registration process described above is to enable the object update server 130 to perform a set of operations for delivering object updates to respective client devices 150, which is described below in connection with FIGS. 4A to 4C. In some embodiments, this set of operations is triggered by the application server 120 receiving a latest version of an object from a respective client device (e.g., client 150-N). As shown in FIG. 4A, the feed provider 126 sends (410-1) an object update message including the object's object ID and its latest version information as well as the client ID of the source client device to the publisher library 128 to indicate that this object has recently been updated and the object update server 130 should notify any client device that has registered with the object update server 130 for receiving updates to this particular object. In some embodiments, the object update message may include an incremental payload. After receiving (420-1) the object update message, the publisher library 128 sends (420-3) an object update request to the object update matcher 138. In some embodiments, the publisher library 128 merges into the matcher 138 such that the feed provider 126 sends the object update messages directly to the object update matcher 138.

Upon receiving (430-1) the object update request, the matcher 138 queries its object update table 136 for an object update record that has the object ID provided by the feed provider 126. If such object update record is found, the matcher 138 updates (430-3) the record using the object's latest version information and sets the object update pending flag to be a non-null value, e.g., an object version number provided by the application server 120 or a timestamp associated with the object update request. If such object update record does not exist, the matcher generates (430-3) a new record in the table 136 using the object's latest version information and sets the object update pending flag to be a non-null value. Next, the object update matcher 139 acknowledges (430-5) the completion of processing the object update request by returning a message to the publisher library 128. The publisher library 128, upon receipt (420-5) of the acknowledgment message from the matcher 138, sends (420-7) a message back to the feed provider 126 (410-3), indicating that the object update request initiated by the feed provider 126 has been acknowledged by the object update server 130.

Figure 4B:
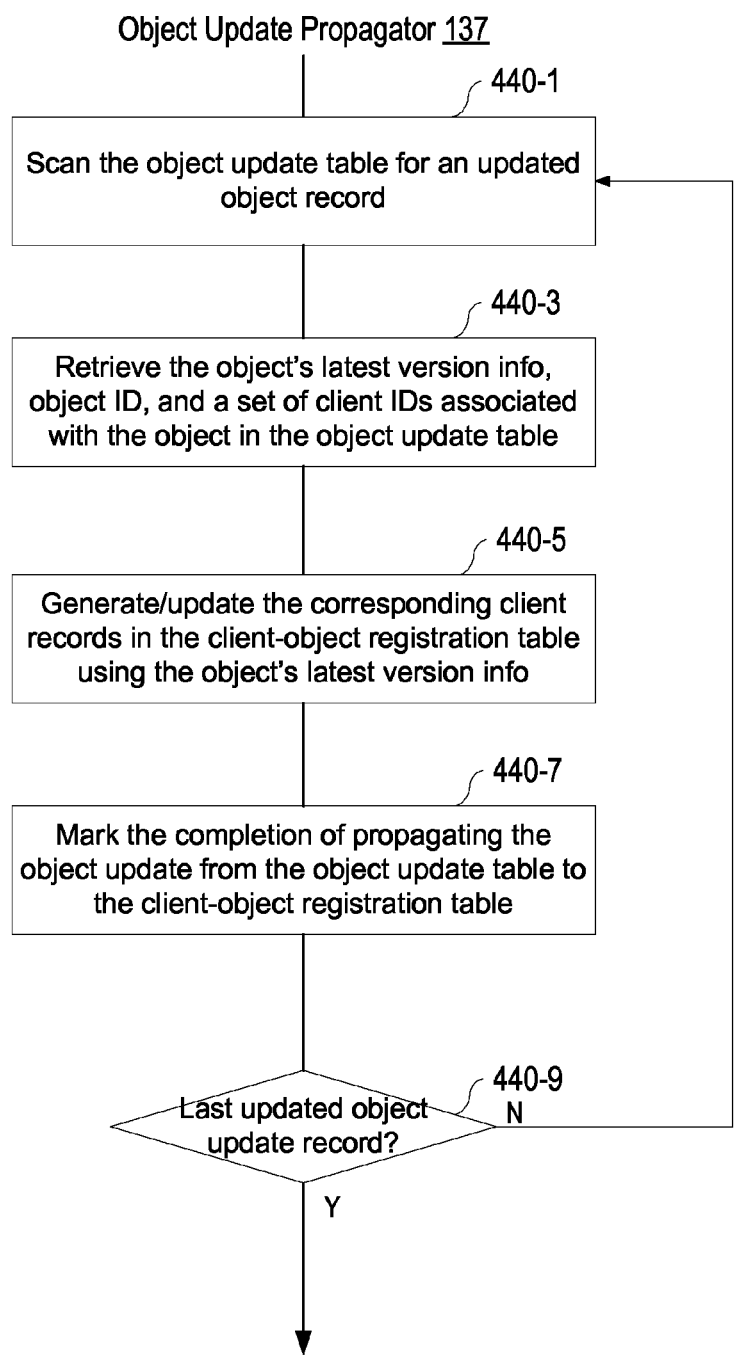

FIG. 4B depicts a flow chart illustrating how the object update propagator 137 migrates the object updates from the object update table 136 to the client-object registration table 134 in accordance with a predefined schedule. In some embodiments, this object update migration schedule is independent from the other operations (e.g., the object registration migrations) performed by the object update server 130. The object update propagator 137 performs a batched scan (440-1) of the table 136 for object update records (including those newly-created ones) in the object update table 136 that have a non-null object update pending flag. In some embodiments, the object update propagator 137 actually scans an in-memory data structure (e.g., a data structure) for non-null object update pending flags.

From each object update record having a non-null object update pending flag, the object update propagator 137 retrieves (440-3) the object's latest version information, the object's object ID, and a set of client IDs associated with the object, each client ID identifying a respective client device that has registered for receiving updates to the object. For each pair of (client ID, object ID) retrieved from the object update record, the object update propagator 137 either generates (440-5) a new client-object registration record or updates (440-5) an existing client-object registration record in the client-object registration table 136 using the object's latest version information. For example, the object update propagator 137 identifies a client record in the table 134 having the client ID and updates a corresponding object entry in the record having the object ID. The updated object entry includes the object's latest version information as its server-side version information and an object update complete flag of "No," which is used by the object update pusher 132 for identifying object updates to be delivered to the respective client devices. Next, the object update propagator 137 marks (440-7) the completion of propagation of the object update from the table 136 to the table 134 by resetting the object update record's object update pending flag to a null value (including resetting the corresponding bit in the in-memory bitmap). The object update propagator 137 repeats (440-9, no) this migration process until the completion (440-9, yes) of the last updated record in the table 136 identified during a particular table scan. In some embodiments, the object update propagator 137 performs this batched table scan and table update independently from other components of the object update server 130. For example, neither the registrar 132 nor the matcher 138 will be halted because the object update propagator 137 has not yet propagated the recent object updates from the table 136 to the table 134.

Figure 4C:
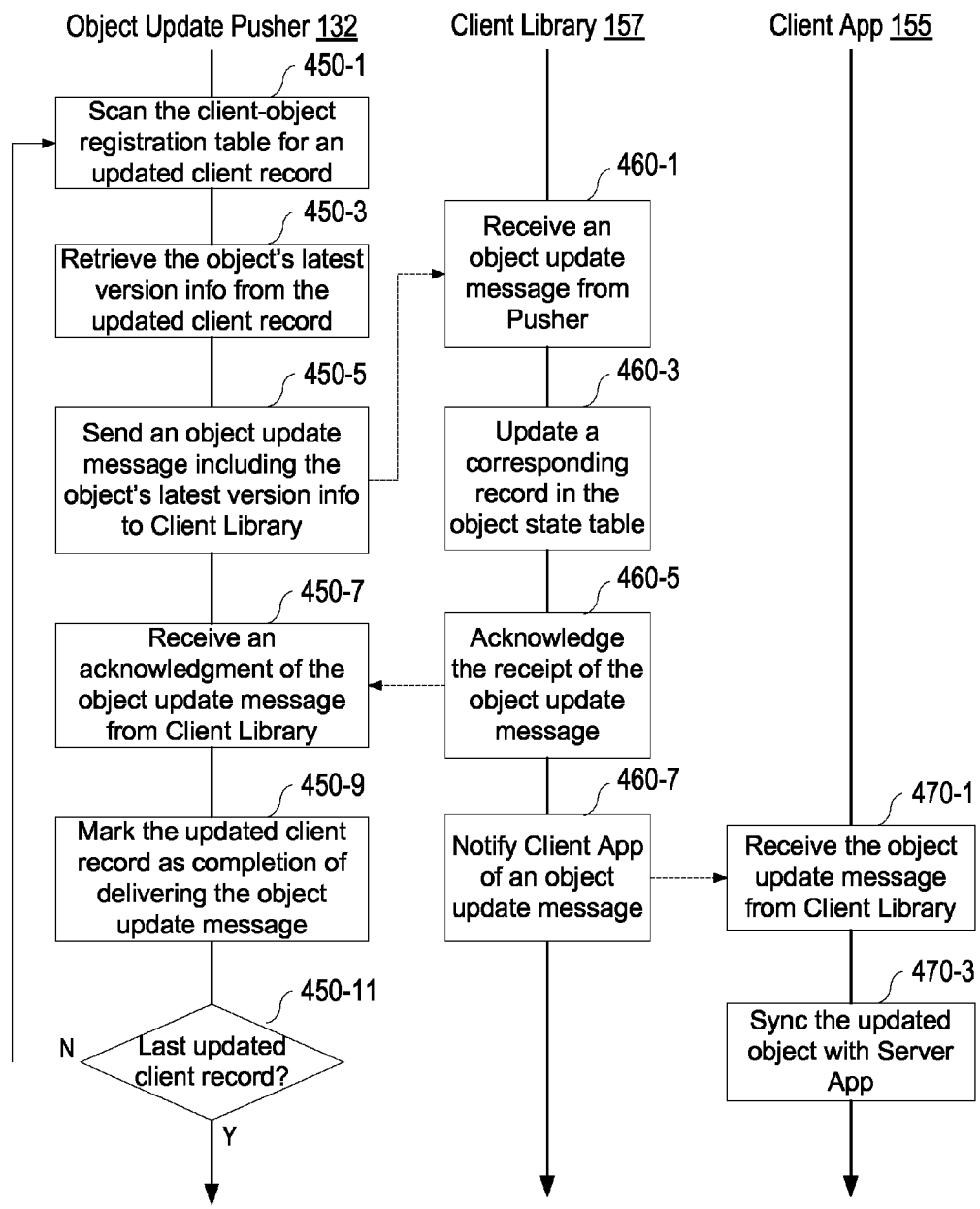

FIG. 4C depicts flow charts illustrating how the object update pusher 132 delivers an object update to a client application targeted by the object update in accordance with some embodiments. Following a predefined schedule, the object update pusher 132 scans (450-1) the client-object registration table 134 for client-object registration records that have been updated by the object update propagator 137 since the last table scan. For each record, the object update pusher 132 determines whether the record includes one or more object entries having an object update complete flag of "no" value, and if true, retrieves (450-3) each identified entry's object ID and server-side version information. Note that one client-object registration record may include multiple object entries corresponding to different objects cached by the same client device. For example, a client device may cache a calendar object, a browser bookmark object, an address book object, etc. For each object, the client device registers an object entry in the table 134 for receiving the corresponding object updates.

For an identified object entry, the object update pusher 132 sends (450-5) an object update message including the object's latest version information stored in the table 134 and an optional payload to the corresponding client library 157. For illustration, FIG. 4C depicts the interactions between the object update pusher 132 with one pair of client library 157 and one client application 155 at the client device 150-1 for one object update. In reality, the object update pusher 132 may identify multiple client-object registration records in the table 134 during one table scan, each record corresponding to a respective client device, and deliver one or more object update messages to each of the client devices 150. Upon receipt (460-1) of the object update message, the client library 157 updates a corresponding object entry in the object state table by replacing its version information with the retrieved server-side version information and saving a copy of the payload at a storage device accessible to the client device. Next, the client library 157 returns (460-5) a confirmation message to the object update pusher 132 acknowledging its receipt of the object update message.

Upon receiving (450-7) the confirmation message, the object update pusher 132 marks (450-9) the identified object entry in the corresponding client-object registration record as completion of delivering the object update message. In some embodiments, the object update pusher 132 updates the client-side version information to be the same as the server-side version information and resets the object update complete flag to be "yes." The object update pusher 132 repeats (450-11, no) this process for every identified object entry of an updated client-object registration record until the completion (450-11, yes) of the last client-object registration record.

The client library 157 may notify (460-7) the client application 155 of the arrival of an object update message (i) after its acknowledgment to the object update pusher 132 (as shown in FIG. 4C), (ii) before its acknowledgment to the object update pusher 132, or (iii) in parallel to its acknowledgment to the object update pusher 132. The object update message includes at least an object's object ID and optionally the object's latest version information as well as incremental payloads. Upon receipt (470-1) of the object update message from the client library 157, the client application 155 synchronizes (470-3) with the application server 120 to retrieve the most recent version of the object to the client device.

Note that the description above assumes that the client device 150-1 (hence the client library 157 and the client application 155) is currently online. In some embodiments, a client device sends a heartbeat signal it is still "alive" to a component in a data center (e.g., the object update server 130) at a predefined frequency. The heartbeat signal is used for updating, e.g., the client device's associated client heartbeat timestamp in the client-object registration table 134. Therefore, from checking the latest client heartbeat timestamp, the object update pusher 132 can determine whether the client device is currently online or offline. For those offline client devices, the object update server 130 maintains their object registrations and object updates for a predefined period of time and then deletes them through garbage collection if they are "dead." For example, a client device is deemed to be "dead" if it is re-imaged. In some embodiments, when an offline client device comes back online, it sends a polling request to the object update server 130 for object updates that were missed by the client device while being offline. The object update pusher 132, in response, scans the table 134 for those object updates and returns them to the client device one by one or in a batch mode.

In some embodiments, the application server 120 may already receive a second object update after it receives a first update to the same object from a first client device but before a message associated with the first object update arrives at a second client device. In this case, the second client device will receive the most recent version of the object (including both the first and second object updates) when it synchronizes with the application server 120. To avoid retrieving the same object from the application server 120 twice, the client application 155 compares the latest version information it receives from the client library 157 with the cached object's version information and only issues a request to synchronize (470-3) with the application server 120 if the latest version information is more recent than the cached object's version information. In some other embodiments, the client application 155 always issues a sync-up request without performing a version information comparison if it is assumed that the object update time interval is longer than the object update delivery latency. In this case, the object update message from the client library 157 or even the object update pusher 132 may not include the latest version information known to the object update server 130 at all.

The object update delivery process described above in connection with FIGS. 4A to 4C assumes that every message arrives at its destination in the right order and there is no drop or re-order of any message that requires a redelivery of any message. In reality, this assumption may not always be true from time to time. In some embodiments, either the publisher library 128 or the object update pusher 132 or both implement a mechanism to capture and redeliver lost messages. For example, the publisher library 128 may repeat the operation 420-3 for a predefined number of times until it receives (420-5) a confirmation message from the object update matcher 138 or give up its delivery effort. The object update pusher 132 may repeat the operation 450-5 for a predefined number of times until it receives (450-7) a confirmation message from the client library 157 or give up its delivery effort. In some embodiments, hysteresis (or a predefined time delay) is built into two consecutive push operations 450-5 to avoid rapidly resending the same object update many times.

In some embodiments, both the application server 120 and the object update server 130 are distributed across multiple data centers 100 in order to better support billions of client devices located all over the world. For example, each data center is configured to support a subset of the client devices that are affiliated with the data center (e.g., those client devices located in the proximity of a data center 100-M). Upon detecting an object update directed to one of the client devices registered with the data center 100-M, the data center 100-M (e.g., the object update server at the data center) will deliver an object update message to the client device in accordance with the description above in connection with FIGS. 4A to 4C, notifying the client device that one of its cached objects may need to be update. In some embodiments, the data center 100-M also delivers the object update message to the other data centers. For example, the application server at the data center (more specifically, the publisher library therein) may send an object update message to each of the multiple data centers and assume that the message has been successfully delivered after receiving acknowledgments from the first N of the data centers while the other data centers may receive the message through across-datacenter data replication.

In some embodiments, the configuration described above requires that the object update server at any data center implement at least the features of: (i) inter-datacenter message delivery, i.e., forwarding/receiving an object update message to/from another object update server; and (ii) inter-datacenter client affiliation relocation, i.e., allowing a client device to move its affiliation from one data center to another data center. The inter-datacenter message delivery is desired when a first client device submits an object update to a first data center whereas a second client registers with a second data center for receiving the object update that is remote from the first data center. The inter-datacenter client affiliation relocation is desired because many web-based applications support mobile devices such as a smartphone to move around and receive the services provided by the applications. A client device that is able to move its affiliation from one data center to another data center usually receives more prompt notification of object update messages from a proximate data center rather than a remote data center.

Figure 5A:
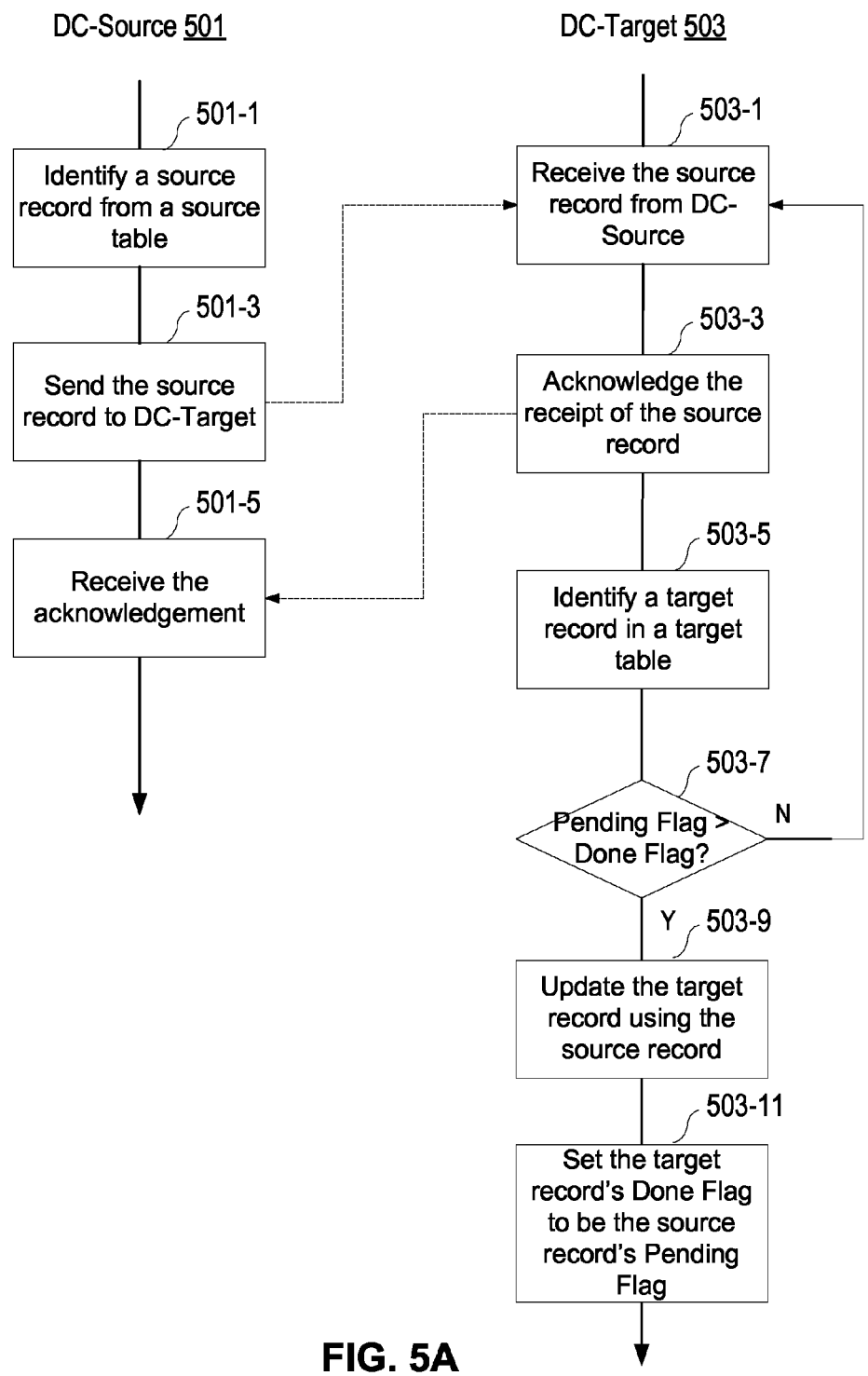
FIG. 5A is a flow chart illustrating how messages are migrated from a source data center to a target data center in accordance with some embodiments.

In some embodiments, the object update server 130 at a data center 100-1 implements the inter-datacenter message delivery through data replication across two data centers. FIG. 5A is a flow chart illustrating an inter-datacenter data migration process in which a message, be it an object registration request or an object update, is migrated from a source data center DC-Source 501 to a target data center DC-target 503 in accordance with some embodiments. In some embodiments, the registration propagator 135 performs this inter-datacenter process while performing the intra-datacenter process described above in connection with FIG. 3B. The object update propagator 137 performs this inter-datacenter process while performing the intra-datacenter process described above in connection with FIG. 4B. In this case, the messages are replicated from an object update server at one data center to another object update server at a different data center. In some other embodiments, there is an independent module at each data center for performing the inter-datacenter data migration process. For example, the application server at one data center may directly notify the object update servers at different data centers 100 of new object updates. In some embodiments, the aforementioned data replication paths both exist to bring new messages to a target data center as quickly as possible.

After identifying (501-1) a source record from a source table, the DC-source 501 sends (501-3) the source record to the DC-target 503. The source record may correspond to a new object registration request entered into the client-object registration table 134 or a new object update message entered into the object update table 136. Upon receiving (503-1) the source record, the DC-target 503 acknowledges (503-3) its receipt of the source record by sending a message back to the DC-source 501 (501-5). Subsequently or in parallel, the DC-target 503 identifies (503-5) a target record in a target table for update. For example, if the source record corresponds to a new object registration request, the target table at the DC-target 503 is its client-object registration table. Using the pair of (client ID, object ID) from the source record, the DC-target 503 tries to identify a corresponding client-object registration record in the client-object registration table. If there is no such record in the table, this means that the client device having the client ID has not yet registered with the DC-target 503. The DC-target 503 may ignore the message to save its resource for those client devices that are currently affiliated with the DC-target 503. In some embodiments, not all the entries in the source record will be sent to the DC-target 503. For example, a client-object registration record's object update complete flag may not be included in the source record. Rather, the DC-target 503 re-calculates the target record's object update complete flag using its server-side and client side version information when updating the target record.

If a target record does exist, the DC-target 503 then compares (503-7) the pending flag of the source record with the done flag of the target record. If the pending flag is greater than the done flag (503-7, yes), the target record has not been updated for the same source record. The DC-target 503 updates (503-9) the target record using the source record and sets (503-11) the record's done flag to be the same as the pending flag of the source record, such as a sequence number, timestamp, or version number associated with the source record. Otherwise (503-7, no), the DC-target 503 returns to wait for the next source record from the same data center or another one.

Because there are multiple data replication paths among the data centers 100, a target data center (e.g., DC-target 503) may receive the same message from different sources multiple times. Checking the attribute like the object registration done flag can filter out those redundant messages and prevent the same target record from being updated repeatedly. Moreover, a new message (e.g., an object registration request) reaching the target data center will be propagated from the client-object registration table to the object update table by the registration propagator. As noted above, the registration propagator resets the object registration pending flag in the client-registration table to be a null value after the intra-datacenter data propagation. Without the object registration done flag, the object registration pending flag will be set to the same non-null value again when a second message concerning the same object registration request arrives at the target center, which triggers the registration propagator to re-propagate the request from the client-object registration table to the object update table during the next scheduled table scan. But with the object registration done flag, the target data center is able to track the most recent message applied to the target record such that another message that carries the same message will be ignored. As a result, the registration propagator migrates an object registration request only if its object registration pending flag is greater than its object registration pending flag, which may be one of a sequence number, a timestamp, and an object version number. After performing the migration, the DC-target 503 resets the object registration pending flag to a null value while keeping the object registration done flag unchanged so that the corresponding record will not be chosen during the next table scan.

In some embodiments, the done flag is reset to a null value at a low frequency, e.g., after a time interval that is longer than what it takes to perform the inter-datacenter data replication so as not to disturb the normal operations at each data center. In some other embodiments, the inter-datacenter data replication only occurs to one of the two tables (e.g., the client-object registration table 134) because the other of the two tables (e.g., the object update table 136) will be automatically updated through the intra-datacenter data replication as described above in connection with FIGS. 3B and 4B.

Figure 5B:
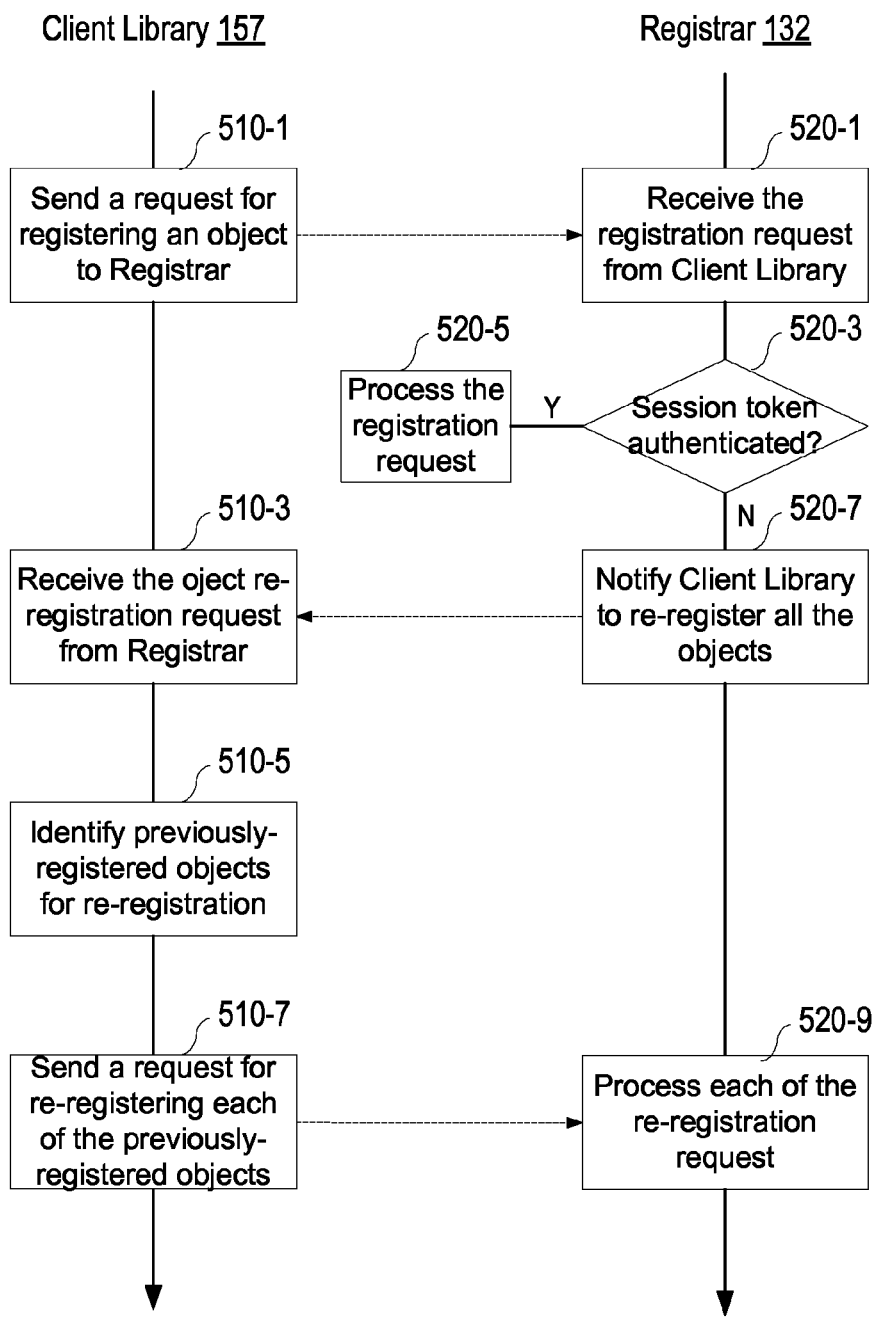
FIGS. 5B and 5C are flow charts illustrating how a client device migrates from a first object update server to a second object update server in accordance with some embodiments.
Figure 5C:
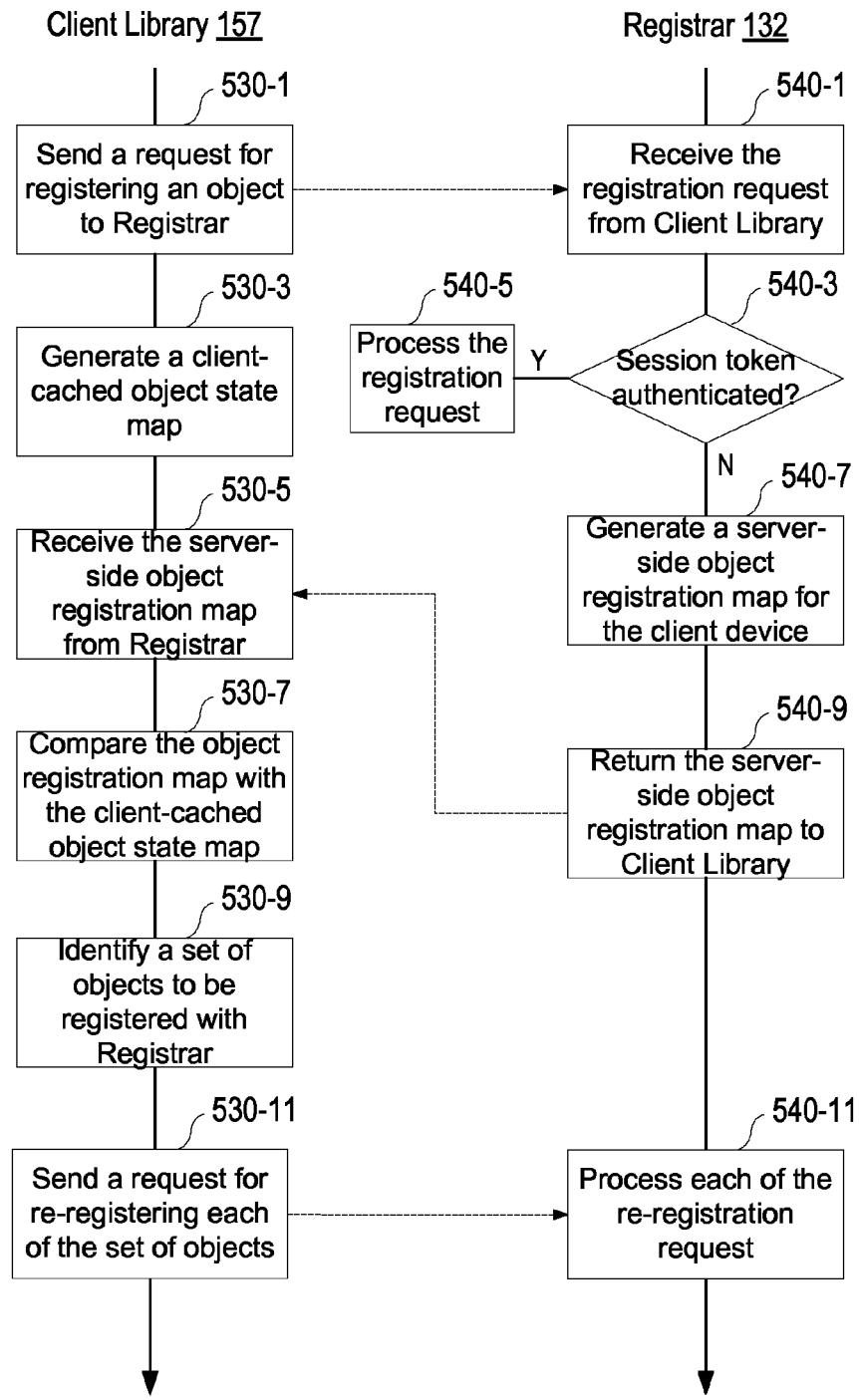

Besides the inter-datacenter message delivery, the distributed network system 10 also allows a client device to move its affiliation from one data center to another data center to support many mobile applications. In some embodiments, the relocation of a client device's affiliation is implemented by moving the client device's object registrations from one data center to another data center. FIGS. 5B and 5C are flow charts illustrating how a client device moves its object registrations in accordance with some embodiments.

As shown in FIG. 5B, a client device starts this re-registration process by instructing its client library 157 to send (510-1) a request for registering an object to a registrar 132 of an object update server at a particular data center. In some embodiments, the request includes a client ID, an object ID, and a session token. Upon receipt (520-1) of the registration request, the registrar 132 tries to authenticate (520-3) the session token provided by the client device. As noted above in connection with FIG. 3A, different data centers issue different session tokens such that a session token issued by the data center 100-1 will not be authenticated by the data center 100-M. But if the session token is authenticated (520-3, yes), the registrar 132 will process (520-5) the registration request in the same manner as described above in connection with FIG. 3A. Otherwise (520-3, no), the registrar 132 notifies (520-7) the client library 157 to re-register all the objects that it would like to receive their updates by providing a new session token to the client library 157. In some embodiments, the data center gives each session token a term of life such that the session token may fail the authentication test (520-3) if it has expired. This may occur after a client device is taken offline for a long time and now tries to reconnect with the same data center. When this occurs, the registrar 132 assumes that all the objects cached by the client device are stale and therefore instructs it to re-register with the registrar 132.

Upon receiving (510-3) the object re-registration request from the registrar 132, the client library 157 identifies (510-5) the previously-registered objects within, e.g., the object state table. In some embodiments, the client library 157 requests the client application 155 to provide a set of objects that the client device is interested in receiving their updates. For each identified object, the client library 157 sends (510-7) a request to the registrar 132 for re-registering this object with the registrar 132. The registrar 132 then processes (520-9) each request accordingly as described above in connection with FIGS. 3A and 3B. In sum, the registrar 132 uses the session token to make a binary decision such that (i) either the client library 157 already registers with the registrar 132 and the registrar 132 continues its current registration by processing new registration requests (e.g., the operation 520-5) (ii) or the client library 157 is deemed to be completely new to the registrar 132 and the registrar 132 forces it to re-register every object (e.g., the operation 510-7).

In some embodiments, a client device had registered a set of objects with a data center before and such registration still exists but the session token has lapsed. FIG. 5C depicts such an embodiment in which the registrar 132 tries to re-use the existing registration to the extent it is possible. Like in FIG. 5B, the client library 157 first sends (530-1) an object registration request to the registrar 132. In some embodiments, the request includes at least a client ID, an object ID, and a session token. Upon receipt (540-1) of the object registration request, the registrar 132 tries to authenticate (540-3) the session token provided by the client device. If the session token is authenticated (540-3, yes), the registrar 132 will process (540-5) the registration request in the same manner as described above in connection with FIG. 3A.

If not (540-3, no), instead of notifying the client library 157 to re-register all the objects that it would like to receive their updates, the registrar 132 queries its associated client-object registration table using the client ID provided by the client library 157. Assuming that the client device had registered with the data center before, the query result includes a set of object IDs identifying the objects registered by the client device and their associated version information known to the data center. Using this query result, the registrar 132 generates (540-7) a server-side object registration map for the client device and returns (540-9) the object registration map and a new session token to the client library 157. In some embodiments, this server-side object registration map is a data structure (e.g., a text string) that includes a set of object IDs and their associated version information arranged in a predefined order (e.g., chronologically or alphabetically). In some other embodiments, the server-side object registration map is a hash of the set of object IDs and their associated version information.

Independently, the client library 157 generates (530-3) a client-cached object state map. In some embodiments, this client-cached object state map is a data structure (e.g., a text string) that includes a set of object IDs and their associated version information arranged in a predefined order (e.g., chronologically or alphabetically). These object IDs identify those client-cached objects that the client is interested in receiving their updates. After receiving (530-5) the server-side object registration map, the client library 157 compares (530-7) it with the client-cached object state map and identifies (530-9) a set of objects that is not found in the data center and that the client library 157 intends to register. In some embodiments, two types of objects may fall into the identified set: (i) objects that the client library 157 has never registered with the data center; and (ii) objects whose version information at the data center is outdated by their counterpart at the client device. For each object in the identified set, the client library 157 sends (530-11) a request to the registrar 132 for re-registering this object with the registrar 132. The registrar 132 then processes (540-11) each request accordingly as described above in connection with FIGS. 3A and 3B.

Refer again to FIG. 4C, in response to an object update notification (460-7), the client application 155 synchronizes (470-3) with the application server 120 to get an object's latest version. In this embodiment, the object update server 130 is only responsible for alerting a client device that an object cached by the client device has been updated and it is not the object update server 130's responsibility for bringing the updated object to the client device. Compared with the embodiments described below in connection with FIGS. 6A to 6C, this embodiment has a relatively simplified design on both the client-side and the server-side but requires an additional round-trip communication between the client device and the application server in order to bring the client-cached object up-to-date. As will described below, an alternative design of the distributed network system is to include the updated object (or at least a portion thereof) in a payload of an object update message and deliver the object update message including the payload to a client device. When the client device receives the object update message, it also receives the update object used for replacing the client-cached object so as to avoid the additional round-trip traffic between the client device and the application server.

In some embodiments, the payload associated with an object update message includes an updated object in its entirety. In other words, there is no data dependency between the updated object and any pre-updated object. What the client device needs to do after receiving the payload is to replace the pre-updated object with the updated object. This design is easy to implement because it requires modest changes to the design of the object update server 120 and the data structures shown in FIGS. 2A to 2D. But because an entire object is transmitted between the application server 120, the object update server 130, and the client devices, this approach may be expensive because it requires the distributed network system 10 to consume more resources such as network bandwidth and storage space. As a result, this approach may be applicable to delivering objects of small sizes or objects lack of continuity across updates (i.e., there is little in common between an updated object and a pre-updated object).

In some other embodiments, an object associated with a web-based service is too large to be included as a payload of an object update message. For example, a user's Gmail account may have multiple gigabytes (GB) of data. It is almost impossible to pass the multi-GB data around as a payload associated with an object update message. Moreover, it is observed that a large-size object is incrementally built up over time and an update to the object corresponds to an addition/deletion/modification to a slight portion of the object such that there is no need for the entire object to be passed around. In fact, this observation is true to many web-based applications. For example, an update to a calendar object may be to add a new appointment to the calendar and an update to an email account object may be to delete a message from the email account. The application server 120 converts the differences between two consecutive versions of an object into a small-size (e.g., from kilobytes to megabytes) incremental payload and forwards the incremental payload to the object update server 130 for delivery to a client device together with an object update message. Using the incremental payload, the client device (e.g., the client application 155) can rebuild the entire client-cached object to be up-to-date with the same object on the server side. FIGS. 2A to 2D depict the data structures supporting this configuration. A more detailed description of the process is provided below in connection with FIGS. 6A and 6B.

Figure 6A:
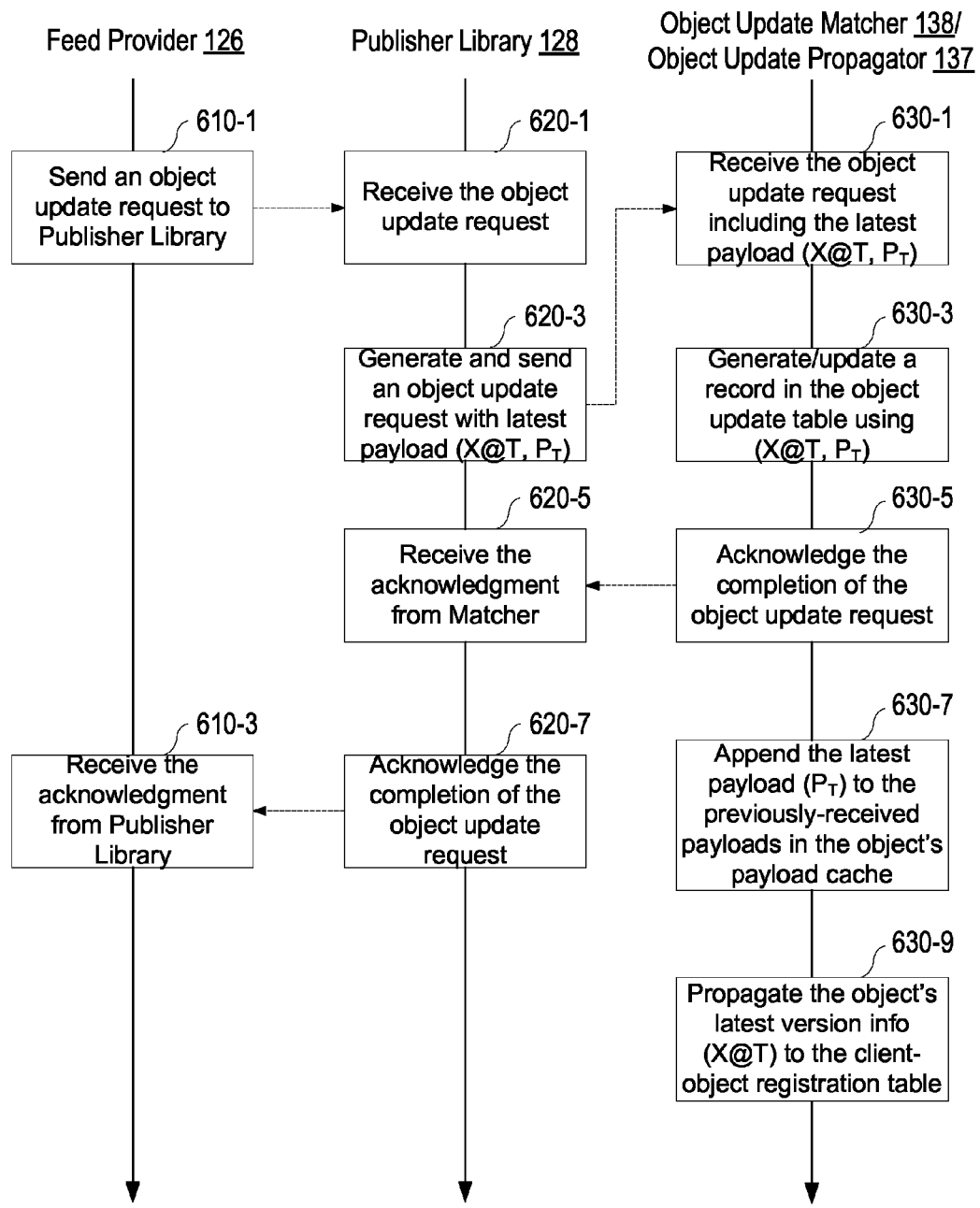
FIGS. 6A and 6B are flow charts illustrating how an object update server delivers to a client device one or more incremental payloads associated with an object cached by the client device in accordance with some embodiments.

As shown in FIG. 6A, the feed provider 126 sends (610-1) an object update request to the publisher library 128. In some embodiments, the object update request includes an object ID, the object's current version information, a source client ID identifying the client device that initiates the object update, and an incremental payload corresponding to the updated portion of the object. In some embodiments, for security reason or ease of implementation, the internal data structure of the incremental payload is opaque to the publisher library 128 and the object update server 130, which treat the incremental payload as a binary or textual string. In some other embodiments, at least a portion of the internal data structure of the incremental payload is revealed to the publisher library 128 or the object update server 130, which may use such information to combine multiple incremental payloads into one and then push the combined incremental payload to a client device together with an object update message.

In response (620-1) to the object update request, the publisher library 128 generates (620-3) a new object update request in accordance with, e.g., a predefined protocol between the publisher library 128 and the matcher 138 and sends (620-3) the object update request ($X@T$, $P_T$) to the matcher 138. Note that the expression "$X@T$" represents the object X's latest version information at the timestamp T (e.g., when the object X was updated at the application server 120) and the expression "$P_T$" corresponds to the latest incremental payload to be delivered to the affected client devices. Upon receiving (630-1) the object update request including the latest incremental payload, the matcher 138 generates (630-3) a new entry in the object update table if this is the first update to the object X or updates (630-3) an existing entry. As a result, the object X's latest version information and incremental payload are added to the corresponding entry in the object update table 136. As shown in FIG. 2B, the object update record 231 may include one or more incremental payloads (242-a, . . . , 242-z), each incremental payload having a parameter indicating the object's corresponding version information. As will be explained below, this parameter is used by the object update server 130 to arrange the delivery or merging of the multiple incremental payloads in the correct order. Next, the matcher 138 acknowledges (630-5) its completion of the object update request to the publisher library 128. The publisher library 128, upon receiving (620-5) the acknowledgment, sends (620-7) an acknowledgment back to the feed provider 126 (610-3) to complete a communication round-trip between the application server 120 and the object update server 130.

In some embodiments, the object update server 130 maintains a payload cache in its memory for storing the incremental payloads associated with different objects in addition to loading them into the object update table 136. As will be described below in connection with FIG. 6B, the object update pusher 132 does not retrieve an object's incremental payloads from the object update table 136 unless its effort of retrieving the incremental payloads from the payload cache fails. For convenience, the object's incremental payloads in the payload cache are stored in the order that they are generated by the application server 120. As such, the matcher 138 appends (630-7) the latest incremental payload to the other previous-received incremental payloads in the payload cache. Next, the object update propagator 137 propagates (630-9) the object X's latest version information $X@T$ to the client-object registration table as described above in connection with FIG. 4B.

Figure 6B:
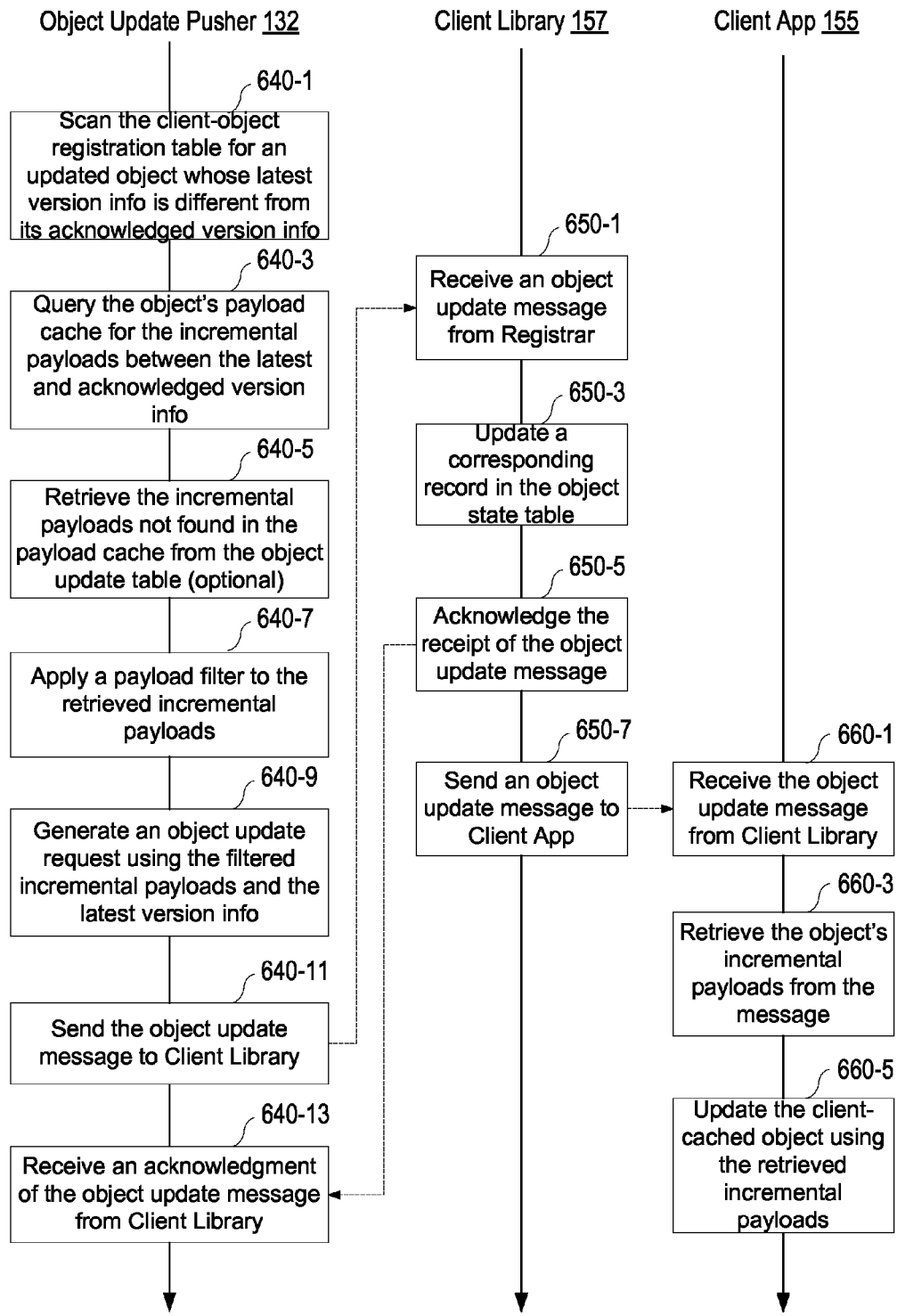
Figure 6C:
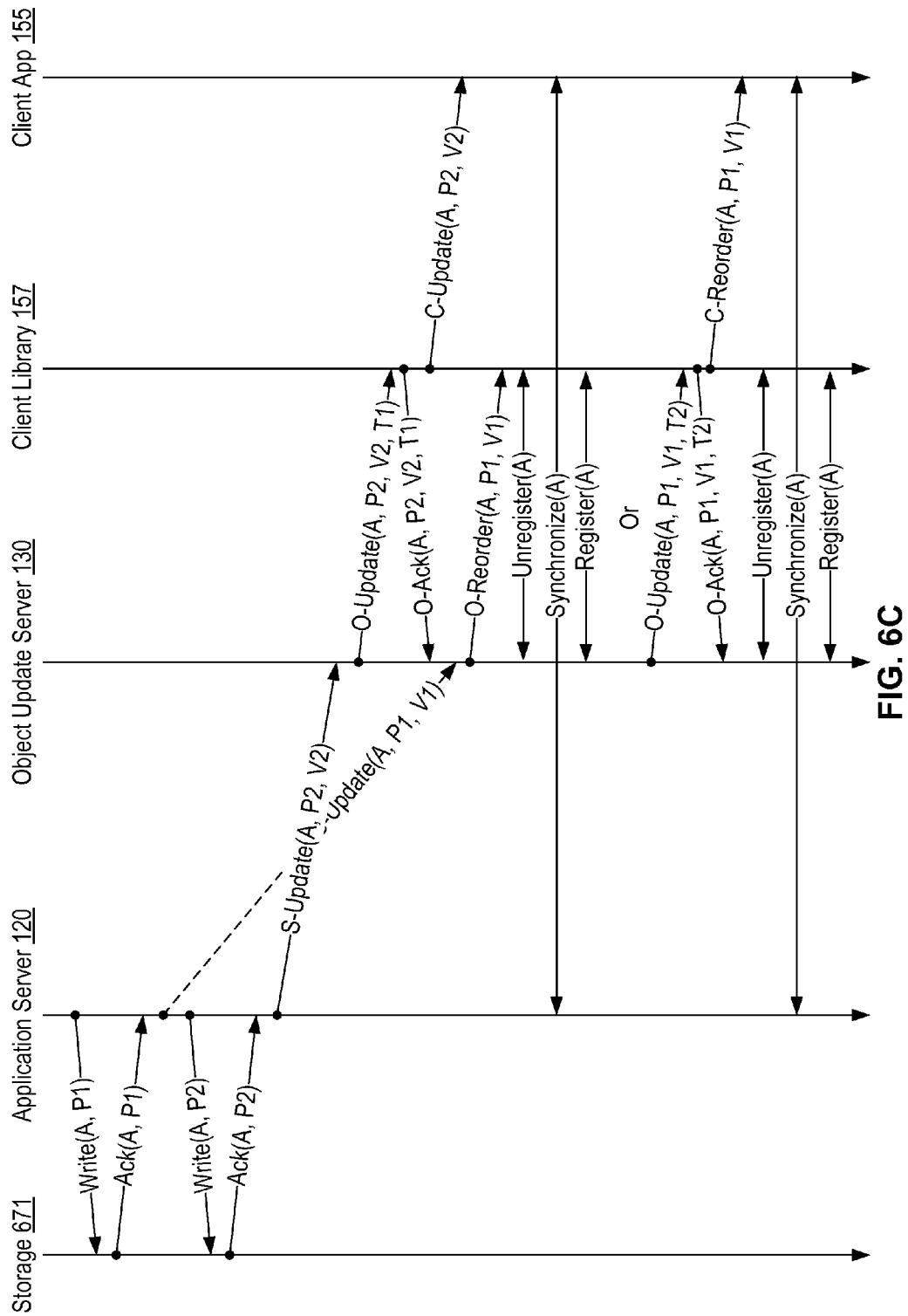
FIG. 6C is a flow chart illustrating how the client device deals with out-of-order incremental payloads from the object update server in accordance with some embodiments.

FIG. 6B further depicts flow charts illustrating the interactions between the server-side object update pusher 132 and the client-side client library 157 and the client application 155. As described above in connection with FIG. 4C, the object update pusher 132 performs (640-1) table scan of the client-object registration table 134 for generating an object update message that needs to be delivered to the respective client devices. Based on the table scan, the object update pusher 132 also determines which, if any, incremental payloads should be delivered together with the object update message and queries (640-3) the payload cache for retrieving the object's associated incremental payload(s) between the latest version of the object known to the object update server 130 and the object cached by the client device. For any cache miss, the object update pusher 132 then retrieves (640-5) those missed incremental payloads from the object update table 136.

In some embodiments, when a client device registers an object, it provides to the object update server 130 one or more payload filters 220 as described above in connection with FIG. 2A. A payload filter is used for filtering out those incremental payloads that are not currently required by the client device. For example, a user of a web-based calendar application is usually interested in his or her appointments in next week or month. When the user registers for receiving updates to his or her calendar object, the user may submit to the object update server 130 a payload filter that specifies a sliding time window of a week or a month from the current time for filtering out those incremental payloads corresponding to appointments falling outside the sliding time window. If the application server 120 sends a request including an incremental payload corresponding to a new appointment for the user that is six months from the present, the object update server 130 will process the request as described above in connection with FIG. 6A. But when the object update pusher 132 determines what incremental payloads should be delivered to a client device associated with the user, this incremental payload corresponding to the six-month afar appointment will be filtered out by applying (640-7) the payload filters to the retrieved incremental payloads.

Next, the object update pusher 132 generates (640-9) an object update request using the filtered incremental payloads and the object's latest version information and sends (640-11) the object update request to the client library 157. Upon receiving (650-1) the object update request, the client library 157 then updates (650-3) a corresponding record in the object update table accordingly and acknowledges (650-5) its receipt of the object update request to the object update pusher 132 (640-13), which then marks the corresponding record in the client-object registration record (see, e.g., 450-9 of FIG. 4C). In addition, the client library 157 sends (650-7) an object update message including the associated payloads to the client application 155. In response (660-1) to the object update message, the client application 155 retrieves (660-3) the incremental payloads from the message and updates (660-5) the client-cached object using the retrieved incremental payloads.

In some embodiments, the object update server 130 may not deliver an object's incremental payloads when delivering an update to the object to a respective client device. For example, it is quite common that a client device may go offline for a long period of time. During the same time period, the object update server 130 may end up accumulating a large number of incremental payloads associated with the objects cached by the client device. As such, the object update server 130 has to allocate more resources for managing these incremental payloads. Moreover, the object update server 130 has to make sure that it is able to securely deliver a large amount of data to the client device, which is the problem that the aforementioned incremental payload-based approach tries to avoid. Another issue that the object update server 130 has to deal with is that an object update message may be lost or re-ordered during the delivery process. Therefore, there is no guarantee that every incremental payload will be delivered to a client device and, even if delivered, all the incremental payloads will be delivered in the same order that they were generated by the application server 120.

In some embodiments, the object update server 130 solves the aforementioned problem by only guaranteeing the delivery of an object update message without any incremental payload and making best effort to deliver the incremental payloads as long as predefined criteria are met. For example, the matcher 138 notifies the feed provider 126 not to send incremental payloads for an object if the amount of incremental payloads for this object accumulated in the object update table 136 has reached a predefined threshold (e.g., 10-100 MB). In addition, the matcher 138 may delete the accumulated incremental payloads from the table 136 and free the resources for other use. On the other hand, the object update server 130 still accepts and processes new object update messages from the application server 120. After the client device is back online, the object update server 130 will send an object update including the object's latest version information to the client device and instruct the client device to synchronize with the application server for the latest version of the object as described above in connection with FIG. 4C. After that, the object update server 130 may resume the practice of accepting new incremental payloads from the application server 120.

In other words, the object update server 130 uses the approach of delivering object update alert only (as described above in connection with FIGS. 4A to 4C) as its fallback option when its effort of delivering incremental payloads fails. But the object update server 130 is also able to resume the effort of delivering payloads when certain conditions are met. Note that one skilled in the art would understand that some changes to its data structures (such as those shown in FIGS. 2A to 2D) may be helpful in order for the object update server 130 to switch back and forth between the two message delivery options. For example, the object update table 136 may include a binary flag indicating which message delivery option the object update server is currently practicing.

There are multiple reasons that the application server generates object updates and incremental payloads in one order that the object update server receives them in a different order. For example, two consecutive object updates generated by two application servers located at two data centers may arrive at the object update server in a reverse order if there is any traffic delay at one of the two data centers. As described above, the object update server's operation is not affected by the re-ordered object update messages because the object update message having more recent object version information (which may be a monotonically increasing number or a timestamp associated with the object update) always trumps the object update message having less recent information regardless of their arrival sequence at the object update server.

But the re-ordering of incremental payloads at the object update server may cause incorrect object updates at a client device. For example, assume that the web-based calendar application generates a first object update to add an appointment to a user's calendar and then generates a second object update to delete the appointment from the user's calendar. If the object update server receives and processes the two object updates in a reverse order, a client-cached object at a client device may end up with an appointment that should have been deleted.

In some embodiments, the object update server solves this problem by detecting a gap in the object's version information. For example, if every object update has a unique sequential version number (e.g., 1, 2, 3, . . . ), the object update server can easily tell whether it processes the object updates in the same order as they are generated by the application server by checking whether the last two object updates' associated version numbers are in sequence or not. Whenever detecting a gap in the object's version information, the object update server may stop delivering new incremental payloads and therefore fall back to the option of delivering object update alerts alone. Alternatively, the object update server may wait for those missed object updates to arrive and fill the gap and then resume delivering the object updates including incremental payload in the correct order.

In some other embodiments, it may be difficult for the object update server to tell whether there is a gap in the object's version information based on the version information in its possession. For example, if every object update is marked by a timestamp at which it was created, the object update server would be unable to tell whether the object updates arriving at the object update server are re-ordered or not from the last two object updates' timestamps because another object update that was generated between the last two object updates may be delayed. In other words, it is possible that the object update server may detect a gap in the object's version information after it already delivers the last object updates (including their incremental payloads) to a client device. FIG. 6C illustrates a method of detecting this type of object update re-order and correcting it in accordance with some embodiments. In this example, it is assumed that the two consecutive object updates, generated by the same application server 120, arrive at the object update server 130 in a reverse order. But the methodology described below is applicable to any kind of object update re-order.

Initially, the application server 120 saves two object updates of the same object A, Write(A, P1) and Write(A, P2), at its storage 671. Note that "P1" and "P2" represent the two incremental payloads associated with the two object updates. In some embodiments, the storage 671 returns, respectively, an acknowledgment Ack(A, P1) and Ack(A, P2) for each of the two object updates. But as shown in FIG. 6C, when the application server 120 delivers the two object updates to the object update server 130, their order is reversed such that the first object update S-Update(A, P1, V1) arrives at the object update server 130 after the second object update S-Update(A, P2, V2). Note that "V1" and "V2" represent the object version information the application server 120 assigns to the two object updates, each corresponding to a timestamp indicating when the corresponding object update occurs at the application server 120.

Note that when the object update server 130 receives the second object update S-Update(A, P2, V2), it is not aware that the first object update S-Update(A, P1, V1) is on the way. In this example, the object update server 130 sends an object update O-Update(A, P2, V2, T1) to the client library 157 without waiting for the arrival of the first object update S-Update(A, P1, V1) and receives an acknowledgment O-Ack(A, P2, V2, T1) from the client library. Note that "T1" is a version number that the object update server gives to the object update. The client library 157 then sends an object update C-Update(A, P2, V2) to the client application 155. In response, the client application 155 may use the object update (in particular, the incremental payload P2) to update its client-cached object.

At sometime later, the first object update S-Update(A, P1, V1) arrives at the object update server 130. In some embodiments, after comparing the timestamp V1 of the first object update S-Update(A, P1, V1) with the timestamp V2 of the second object update S-Update(A, P2, V2) that has been processed by the object update server 130, the object update server 130 realizes that the object updates have been processed out of the order in which they were generated by the application server 120. The object update server 130 then sends an object update reorder O-Reorder(A, P1, V1) to the client library 157, notifying that the client-cached object may be inconsistent with the object managed by the application server 120. In response, the client library 157 deregisters the object A with the object update server 130, causes the client application 155 to synchronize with the application server 120 to receive the latest version of the object A, and then re-registers with the object update server 130 for the object A. In some embodiments, the client library 157 may invoke an API call to inform the application server 120 that its object state is inconsistent and the application server 120 then takes actions (e.g., pushing the latest version of the object to the client device 150-1 at which the client library 157 resides.

In some other embodiments, the object update server 130 may delegate the responsibility of detecting gaps in the object's version information to the client library 157. As shown in FIG. 6C, the object update server 130 sends an object update O-Update(A, P1, V1, T2) to the client library 157 and receives an acknowledgment O-Ack(A, P1, V1, T2) from the client library 157. Note that "T2" is a version number that the object update server gives to the object update. After detecting the gap in the object version information, the client library 157 then sends an object update reorder C-Recorder (A, P1, V1) to the client application 155, which triggers the client application 155 to synchronize with the application server 120 to receive the latest version of the object A. In addition, the client library 157 deregisters the object A with the object update server 130 and re-registers with the object update server 130 for the object A after the synchronization between the client application 155 and the application server 120.

Figure 7:
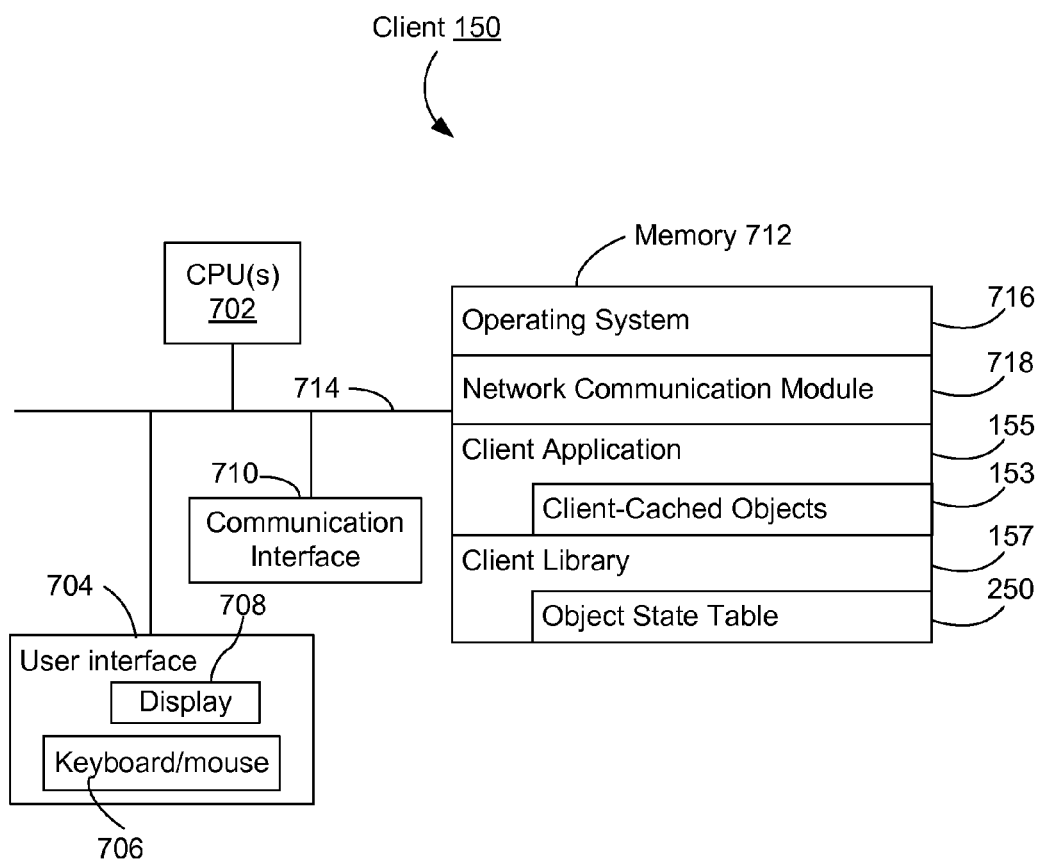
FIG. 7 is a block diagram illustrating a client device configured for registering and receiving object updates from an object update server in accordance with some embodiments.

FIG. 7 is a block diagram illustrating a client device 150 configured for registering and receiving object updates from an object update server in accordance with some embodiments. The client device 150 includes one or more processing units (CPU's) 702 for executing modules, programs and/or instructions stored in memory 712 and thereby performing processing operations; one or more network or other communications interfaces 710; memory 712; and one or more communication buses 714 for interconnecting these components. In some embodiments, the client device 150 includes a user interface 704 comprising a display device 708 and one or more input devices 706 (e.g., keyboard or mouse). In some embodiments, the memory 712 includes high-speed random access memory, such as DRAM, SRAM, DDR RAM or other random access solid state memory devices. In some embodiments, memory 712 includes non-volatile memory, such as one or more magnetic disk storage devices, optical disk storage devices, flash memory devices, or other non-volatile solid state storage devices. In some embodiments, memory 712 includes one or more storage devices remotely located from the CPU(s) 702. Memory 712, or alternately the non-volatile memory device(s) within memory 712, comprises a computer readable storage medium. In some embodiments, memory 712 or the computer readable storage medium of memory 712 stores the following programs, modules and data structures, or a subset thereof:

- an operating system 716 that includes procedures for handling various basic system services and for performing hardware dependent tasks;
- a network communications module 718 that is used for connecting the client device 150 to other computers via the communication network interfaces 710 and one or more communication networks (wired or wireless), such as the Internet, other wide area networks, local area networks, metropolitan area networks, and so on;
- one or more client applications 155, each client application including one or more client-cached objects 153, such as web-based electronic messaging, calendar, address book, browser bookmarks; and
- one or more client libraries 157, each client library including a data structure 250 (e.g., an object state table) for tracking the status of the client-cached objects registered at the object update server.

Figure 8:
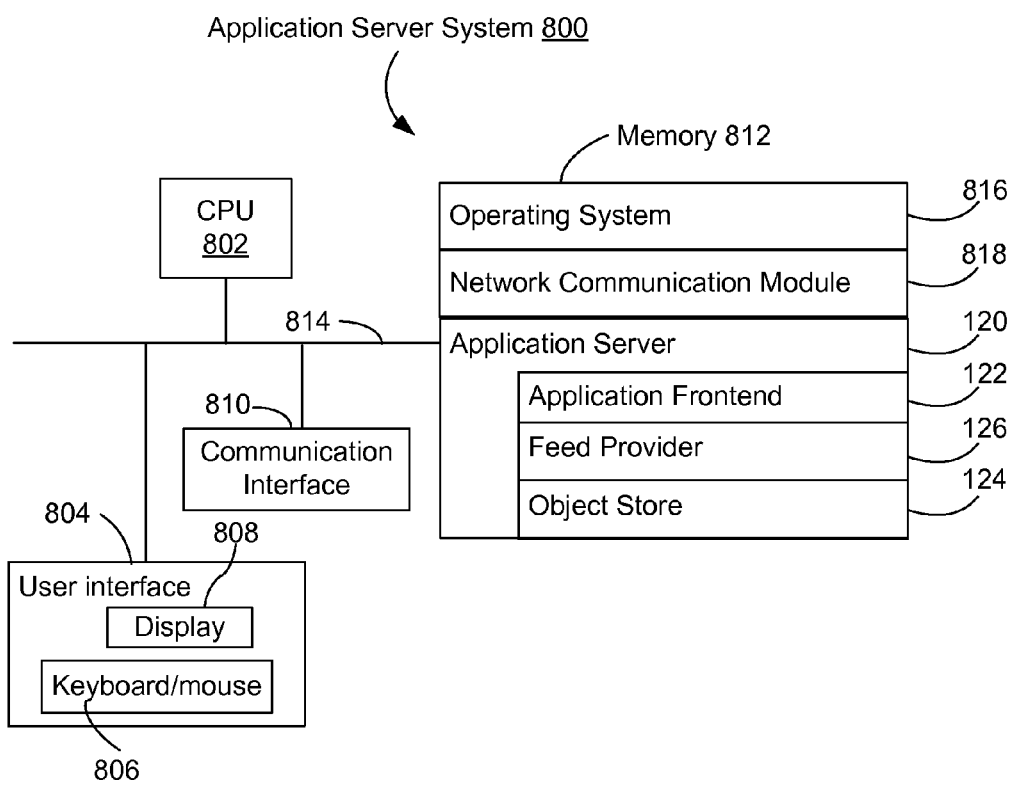
FIG. 8 is a block diagram illustrating an application server system configured for generating object updates in accordance with some embodiments.

FIG. 8 is a block diagram illustrating an application server system 800 configured for generating object updates in accordance with some embodiments. The server system 800 includes one or more processing units (CPU's) 802 for executing modules, programs and/or instructions stored in memory 812 and thereby performing processing operations; one or more network or other communications interfaces 810; memory 812; and one or more communication buses 814 for interconnecting these components. In some embodiments, the server system 800 includes a user interface 804 comprising a display device 808 and one or more input devices 806 (e.g., keyboard or mouse). In some embodiments, the memory 812 includes high-speed random access memory, such as DRAM, SRAM, DDR RAM or other random access solid state memory devices. In some embodiments, memory 812 includes non-volatile memory, such as one or more magnetic disk storage devices, optical disk storage devices, flash memory devices, or other non-volatile solid state storage devices. In some embodiments, memory 812 includes one or more storage devices remotely located from the CPU(s) 802. Memory 812, or alternately the non-volatile memory device(s) within memory 812, comprises a computer readable storage medium. In some embodiments, memory 812 or the computer readable storage medium of memory 812 stores the following programs, modules and data structures, or a subset thereof:

- an operating system 816 that includes procedures for handling various basic system services and for performing hardware dependent tasks;
- a network communications module 818 that is used for connecting the server system 800 to other computers via the communication network interfaces 810 and one or more communication networks (wired or wireless), such as the Internet, other wide area networks, local area networks, metropolitan area networks, and so on; and
- one or more application servers 120, each application server including (i) an application frontend 122 for communicating with the client applications at the client devices, (ii) a feed provider 126 for sending object updates to the object update server, and (iii) an object store 124 for storing the objects used by the application server.

Figure 9:
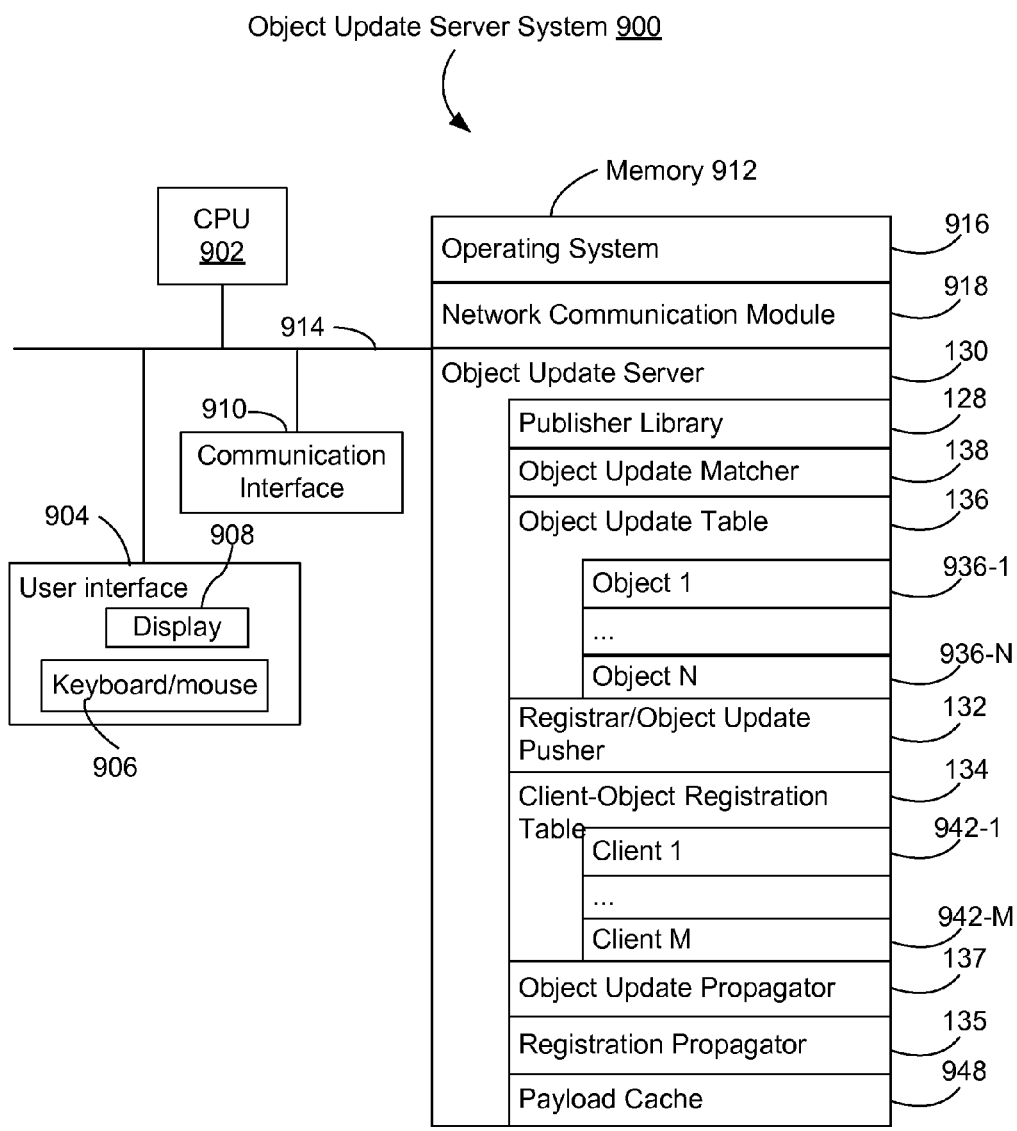
FIG. 9 is a block diagram illustrating an object update server system configured for receiving object updates from the application server system and delivering the object updates to client devices in accordance with some embodiments.

FIG. 9 is a block diagram illustrating an object update server system 900 configured for receiving object updates from the application server system and delivering the object updates to client devices in accordance with some embodiments. The server system 900 includes one or more processing units (CPU's) 902 for executing modules, programs and/or instructions stored in memory 912 and thereby performing processing operations; one or more network or other communications interfaces 910; memory 912; and one or more communication buses 914 for interconnecting these components. In some embodiments, the server system 900 includes a user interface 904 comprising a display device 908 and one or more input devices 906 (e.g., keyboard or mouse). In some embodiments, the memory 912 includes high-speed random access memory, such as DRAM, SRAM, DDR RAM or other random access solid state memory devices. In some embodiments, memory 912 includes non-volatile memory, such as one or more magnetic disk storage devices, optical disk storage devices, flash memory devices, or other non-volatile solid state storage devices. In some embodiments, memory 912 includes one or more storage devices remotely located from the CPU(s) 902. Memory 912, or alternately the non-volatile memory device(s) within memory 912, comprises a computer readable storage medium. In some embodiments, memory 912 or the computer readable storage medium of memory 912 stores the following programs, modules and data structures, or a subset thereof:
- an operating system 916 that includes procedures for handling various basic system services and for performing hardware dependent tasks;
- a network communications module 918 that is used for connecting the server system 900 to other computers via the communication network interfaces 910 and one or more communication networks (wired or wireless), such as the Internet, other wide area networks, local area networks, metropolitan area networks, and so on; and
- an object update server 130, further including (i) a publisher library 128 for receiving object updates from the feed provider of an application server and propagating these updates to the object update matcher, (ii) an object update matcher 138 for receiving object updates from the publisher library 128 and storing these updates in the object update table 136 including a plurality of object update records (936-1, ..., 936-N), each record identifying an object and a set of client devices that have registered for receiving updates to the object, (iii) a registrar/object update pusher 132 for receiving object registration requests from the client devices and storing them in a client-object registration table 134 including a plurality of client-object registration records (942-1, ..., 942-M), each record identifying a client device and a set of objects that the client device has registered for receiving their updates, and pushing object update messages to the client devices, (iv) an object update propagator 137 for migrating new object updates from the table 136 to the table 134, (v) a registration propagator 135 for migrating new object registrations from the table 134 to the table 136, and (vi) a payload cache 948 for storing incremental payloads associated with different objects.

Although some of the various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
at a server having memory and one or more processors, wherein the server has access to, respectively, a plurality of client-object registration records, each record including a client identifier, an object identifier, and a pair of server-side object version and client-side object version associated with the object identifier, and a plurality of object update records, each record including an object identifier and a plurality of incremental payloads, each incremental payload corresponding to a respective object version:
selecting a first client-object registration record including a first client identifier and a first object identifier;
retrieving a pair of server-side object version and client-side object version from the first client-object registration record;
determining a first set of incremental payloads to be delivered to a first client device associated with the first client identifier in accordance with the pair of server-side object version and client-side object version;
retrieving the first set of incremental payloads from a first object update record including the first object identifier; and
sending a first object update message to the first client device, wherein the first object update message includes the first object identifier, the server-side object version and the retrieved first set of incremental payloads.

2. The method of claim 1, further comprising:
receiving an object update confirmation message from the first client device; and
updating the first client-object registration record using the received object update confirmation message.

3. The method of claim 2, wherein the first client-object registration record is updated so that the client-side version is the same as the server-side version.

4. The method of claim 2, further comprising:
repeating an attempt of sending the first object update message to the first client device if no object update confirmation message is returned from the first client device until after a predefined number of attempts; and
updating the first client-object registration record to stop sending object update messages to the first client device.

5. The method of claim 1, wherein the first client-object registration record includes a payload filter and determining the first set of incremental payloads includes applying the payload filter to each incremental payload so that the determined set includes incremental payloads that satisfy the payload filter.

6. The method of claim 1, further comprising:
after retrieving the first set of incremental payloads,
combining the retrieved first set of incremental payloads into a merged incremental payload in accordance with their respective object versions; and
sending the merged incremental payload as a member of the first object update message to the first client device.

7. The method of claim 1, further comprising:
after retrieving the first set of incremental payloads,
determining whether the retrieved first set of incremental payloads has missed any incremental payload whose object version is between the pair of server-side object version and client-side object version; and
sending the first object update message excluding any of the first set of incremental payloads to the first client device if there is at least one missed incremental payload.

8. The method of claim 1, wherein one or more of the plurality of incremental payloads are stored in an in-memory data structure of the server, further comprising:
before retrieving the first set of incremental payloads from the first object update record:
retrieving a first subset of the first set of incremental payloads from the in-memory data structure if the first subset is found in the in-memory data structure; and
retrieving a second subset of the first set of incremental payloads from the first object update record if the second subset is not found in the in-memory data structure.

9. The method of claim 1, further comprising:
before selecting the first client-object registration record,
receiving an object update message from a server-side application, wherein the object update message includes the first object identifier, a latest object version, and a first incremental payload;
updating the first object update record using the latest object version and the first incremental payload;
propagating the update to the first object update record to the first client-object registration record by setting the server-side object version to be the latest object version.

10. The method of claim 9, further comprising:
after updating the first object update record, sending an object update confirmation message to the server-side application.

11. The method of claim 9, wherein the first object update record is not updated in response to the object update message if the object's version information in the first object update record is more recent than the latest object version.

12. The method of claim 1, further comprising:
receiving a request for object updates from a second client device, wherein the request includes the first object identifier, the object's version at the second client device, and a second client identifier;
determining a second set of incremental payloads to be delivered to the second client device in accordance with the server-side object version and the object's version at the second client device;
retrieving the second set of incremental payloads from the first object update record; and
sending a second object update message to the second client device, wherein the second object update message includes the first object identifier, the server-side object version and the retrieved second set of incremental payloads.

13. The method of claim 1, wherein the first object identifier corresponds to one selected from the group consisting of a web-based calendar, a browser bookmark, an address book, and a set of email messages associated with a user.

14. The method of claim 1, wherein the first client device corresponds to one selected from the group consisting of a desktop, a laptop, a tablet, a smartphone, and a netbook.

15. A server system, wherein the server system has access to, respectively, a plurality of client-object registration records, each record including a client identifier, an object identifier, and a pair of server-side object version and client-side object version associated with the object identifier, and a plurality of object update records, each record including an object identifier and a plurality of incremental payloads, each incremental payload corresponding to a respective object version, comprising:
one or more processors for executing programs; and
memory to store data and to store one or more programs to be executed by the one or more processors, the one or more programs including instructions for:
selecting a first client-object registration record including a first client identifier and a first object identifier;
retrieving a pair of server-side object version and client-side object version from the first client-object registration record;
determining a first set of incremental payloads to be delivered to a first client device associated with the first client identifier in accordance with the pair of server-side object version and client-side object version;
retrieving the first set of incremental payloads from a first object update record including the first object identifier; and
sending a first object update message to the first client device, wherein the first object update message includes the first object identifier, the server-side object version and the retrieved first set of incremental payloads.

16. A non-transitory computer readable-storage medium storing one or more programs for execution by one or more processors of a server system, wherein the server system has access to, respectively, a plurality of client-object registration records, each record including a client identifier, an object identifier, and a pair of server-side object version and client-side object version associated with the object identifier, and a plurality of object update records, each record including an object identifier and a plurality of incremental payloads, each incremental payload corresponding to a respective object version, the one or more programs comprising instructions for:
selecting a first client-object registration record including a first client identifier and a first object identifier;
retrieving a pair of server-side object version and client-side object version from the first client-object registration record;
determining a first set of incremental payloads to be delivered to a first client device associated with the first client identifier in accordance with the pair of server-side object version and client-side object version;
retrieving the first set of incremental payloads from a first object update record including the first object identifier; and
sending a first object update message to the first client device, wherein the first object update message includes the first object identifier, the server-side object version and the retrieved first set of incremental payloads.

* * * * *